(12) United States Patent
Otsuka

(10) Patent No.: US 9,426,164 B2
(45) Date of Patent: Aug. 23, 2016

(54) NETWORK DEVICE AND NETWORK SYSTEM

(71) Applicant: Hitachi Automotive Systems, Ltd., Hitachinaka-shi, Ibaraki (JP)

(72) Inventor: Satoshi Otsuka, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/563,217

(22) Filed: Dec. 8, 2014

(65) Prior Publication Data

US 2015/0172298 A1 Jun. 18, 2015

(30) Foreign Application Priority Data

Dec. 12, 2013 (JP) .................................. 2013-257364

(51) Int. Cl.
*H04L 9/32* (2006.01)
*H04L 29/06* (2006.01)

(52) U.S. Cl.
CPC .............. *H04L 63/123* (2013.01); *H04L 63/08* (2013.01)

(58) Field of Classification Search
CPC ....... G06F 21/31; G06F 21/44; H04L 63/08; H04L 63/12; H04L 63/20; H04L 63/123; H04L 63/126; H04L 63/1433; H04L 63/1466

USPC .............. 726/2–6, 26–30; 713/168–170, 181
See application file for complete search history.

(56) References Cited

U.S. PATENT DOCUMENTS

| | | | | |
|---|---|---|---|---|
| 6,061,794 A | * | 5/2000 | Angelo ................. | G06F 21/606 710/107 |
| 7,624,439 B2 | * | 11/2009 | Koestler ................ | G06F 21/62 370/438 |
| 8,285,989 B2 | * | 10/2012 | Lucidarme ........... | H04L 9/0825 380/28 |
| 2007/0016801 A1 | * | 1/2007 | Bade ...................... | G06F 21/57 713/193 |

OTHER PUBLICATIONS

Matsumoto, Tsutomo, et al.; A Method of Preventing Unauthorized Data Transmission in Controller Area Network; 2012; 5 pages; 2012 IEEE 75th.

* cited by examiner

*Primary Examiner* — Hosuk Song
(74) *Attorney, Agent, or Firm* — Foley & Lardner LLP

(57) ABSTRACT

A network device connected via a bus with a plurality of network devices includes: an authentication unit that executes authentication based upon message authentication information included in data transmitted, via the bus, by one of the plurality of network devices acting as a sender device; and a processing unit that invalidates the data upon determining that unauthorized data have been transmitted by the sender device impersonating another network device among the plurality of network devices if the authentication fails.

9 Claims, 25 Drawing Sheets

FIG.6

|  | DATA LENGTH (byte) | DATA LENGTH CODE ||||
| --- | --- | --- | --- | --- | --- |
|  |  | bit3 | bit2 | bit1 | bit0 |
| CAN/CANFD | 0 | 0 | 0 | 0 | 0 |
|  | 1 | 0 | 0 | 0 | 1 |
|  | 2 | 0 | 0 | 1 | 0 |
|  | 3 | 0 | 0 | 1 | 1 |
|  | 4 | 0 | 1 | 0 | 0 |
|  | 5 | 0 | 1 | 0 | 1 |
|  | 6 | 0 | 1 | 1 | 0 |
|  | 7 | 0 | 1 | 1 | 1 |
| CAN | 8 | 1 | 0/1 | 0/1 | 0/1 |
| CANFD | 8 | 1 | 0 | 0 | 0 |
|  | 12 | 1 | 0 | 0 | 1 |
|  | 16 | 1 | 0 | 1 | 0 |
|  | 20 | 1 | 0 | 1 | 1 |
|  | 24 | 1 | 1 | 0 | 0 |
|  | 32 | 1 | 1 | 0 | 1 |
|  | 48 | 1 | 1 | 1 | 0 |
|  | 64 | 1 | 1 | 1 | 1 |

FIG.7A

| 8 | 6 | 6 | 2 | 46~1500 | 4 |
|---|---|---|---|---|---|
| PREAMBLE | DESTINATION ADDRESS | SOURCE ADDRESS | TYPE | DATA | FCS |

FIG.7B

| 7 | 1 | 6 | 6 | 2 | 46~1500 | 4 |
|---|---|---|---|---|---------|---|
| PREAMBLE | SFD | DESTINATION ADDRESS | SOURCE ADDRESS | LENGTH/ TYPE | DATA | FCS |

FIG.8A

| VERSION (4) | HEADER LENGTH (4) | TYPE OF SERVICE (8) | TOTAL LENGTH (16) | |
|---|---|---|---|---|
| IDENTIFICATION (16) | | | FLAGS (3) | FRAGMENT OFFSET (13) |
| TIME TO LIVE (8) | | PROTOCOL (8) | CHECKSUM (16) | |
| SOURCE ADDRESS (32) | | | | |
| DESTINATION ADDRESS (32) | | | | |
| OPTION DATA (VARIABLE) | | | | |
| (PAYLOAD) | | | | |

FIG.8B

| VERSION (4) | TRAFFIC CLASS (8) | FLOW LABEL (20) | | |
|---|---|---|---|---|
| | PAYLOAD LENGTH (16) | | PROTOCOL (8) | TIME TO LIVE (8) |
| SOURCE ADDRESS (128) | | | | |
| DESTINATION ADDRESS (128) | | | | |
| (PAYLOAD) | | | | |

FIG.9

| SOURCE PORT NUMBER (16) | DESTINATION PORT NUMBER (16) | | |
|---|---|---|---|
| SEQUENCE NUMBER (32) | | | |
| ACKNOWLEDGMENT NUMBER (32) | | | |
| HEADER LENGTH (4) | RESERVED (6) | CONTROL FLAGS (6) | WINDOW SIZE (16) |
| CHECKSUM (16) | | | URGENT POINTER (16) |
| OPTION DATA (VARIABLE) | | | |
| (PAYLOAD) | | | |

FIG.10

| SOURCE PORT NUMBER (16) | DESTINATION PORT NUMBER (16) |
|---|---|
| LENGTH (16) | CHECKSUM (16) |
| (PAYLOAD) ||

| DATA ID | SENDER LINK ID | RECIPIENT LINK ID | SENDER PROTOCOL | RECIPIENT PROTOCOL | AUTHENTICATION TARGET |
|---|---|---|---|---|---|
| 1201 | 1202 | 1203 | 1204 | 1205 | 1206 |
| Data_A | A | B | CANFD | CANFD | Yes |
| Data_B | A | C | CANFD | Ethernet | Yes |
| Data_C | C | D | Ethernet | Ethernet | No |
| ... | ... | ... | ... | ... | |
| ... | ... | ... | ... | ... | |
| ... | ... | ... | ... | ... | |
| Data_Z | B | - | CANFD | - | Yes |

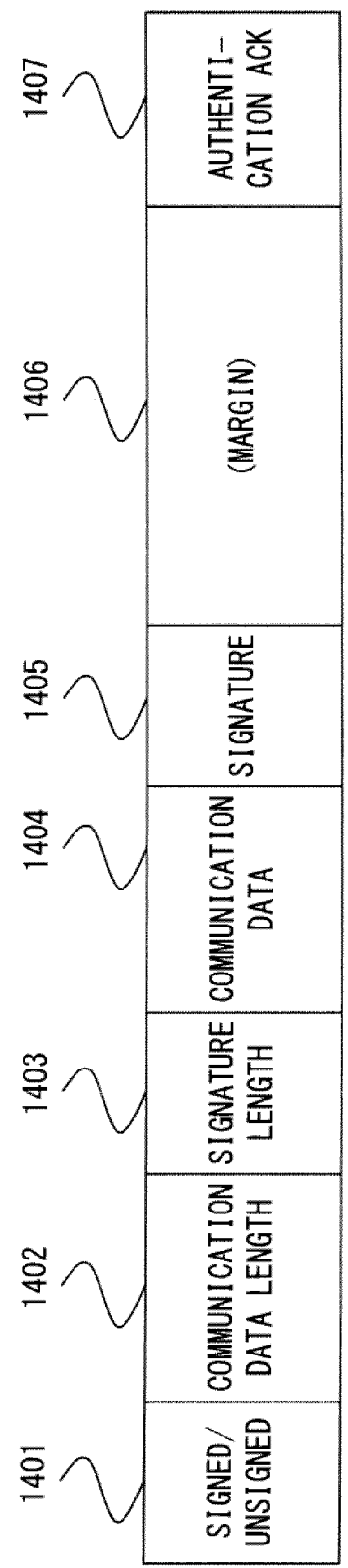

FIG.14

| 504 | | | | | | |
|---|---|---|---|---|---|---|
| DATA ID | PROTOCOL | KEY DATA | KEY VALIDITY PERIOD | KEY VALID FLAG | COMMUNICATION DATA LENGTH | SIGNATURE LENGTH |
| Data_A | CANFD | XXXX | aa:bb:cc | 1 | ddd | eee |
| Data_B | Ethernet | YYYY | | | | |
| Data_C | TCP/IP | ZZZZ | | | | |
| ... | ... | | | | | |
| Data_Z | CANFD | AAAA | | | | |

1501 · 1502 · 1503 · 1504 · 1505 · 1506 · 1507

NETWORK DEVICE AND NETWORK SYSTEM

INCORPORATION BY REFERENCE

The disclosure of the following priority application is herein incorporated by reference: Japanese Patent Application No. 2013-257364 filed Dec. 12, 2013.

BACKGROUND OF THE INVENTION

1. Field of the Invention

The present invention relates to a network device and a network system.

2. Description of Related Art

The following non-patent literature describes technologies constituting the background art in the field pertaining to the present invention: T. Matsumoto, M. Hata, M. Tanabe, K. Yoshioka, K. Oishi, "A method of preventing unauthorized data transmission in controller area network", Vehicular Technology Conference (VTC Spring), 2012 IEEE 75th (2012). This publication describes the following issues "The CAN protocol is designed for bus networks. Each CAN message (CAN frame) has no source and no destination addresses. Therefore, every message is broadcast on a bus. Once an attacker infiltrates an ECU, he can impersonate any other ECUs on the same bus, because any ECU (node) connected to a bus can send arbitrary message. However, the CAN protocol supports no sender authentication and no message authentication." describing issues of the CAN technologies. It proposes, as a means for addressing these issues, "a method of preventing unauthorized data transmission by leveraging the CAN's broadcasting nature. In the proposed method, the ECU to be impersonated monitors and detects the impersonated message and overrides it by sending ErrorFrame before the message transmission completes".

SUMMARY OF INVENTION

The non-patent literature quoted above does not include any description of security measures for a sender network device. If the sender network device is attacked and goes down, protection against the attack cannot be assured since other network devices cannot easily detect the attack. Highly advanced security measures, such as introducing security modules and a verification method to prevent from an implementation of any element of vulnerability, must be taken in order to protect network devices from attacks. This means that individual sender network devices must incur significant costs for such measures.

According to the first aspect of the present invention, a network device connected via a bus with a plurality of network devices comprises: an authentication unit that executes authentication based upon message authentication information included in data transmitted, via the bus, by one of the plurality of network devices acting as a sender device; and a processing unit that invalidates the data upon determining that unauthorized data have been transmitted by the sender device impersonating another network device among the plurality of network devices if the authentication fails.

According to the second aspect of the present invention, a network system comprises: a network device according to the first aspect; and the sender device.

BRIEF DESCRIPTION OF THE DRAWINGS

FIG. 6 presents a chart indicating how data length coding may be achieved in conformance to some communication protocols on a network.

FIG. 7A and FIG. 7B each presents an example of a data structure that may be adopted for data in conformance to a communication protocol on a network.

FIG. 8A and FIG. 8B each presents an example of a data structure that may be adopted for data in conformance to a communication protocol on a network.

FIG. 9 presents an example of a data structure that may be adopted for data in conformance to a communication protocol on a network.

FIG. 10 presents an example of a data structure that may be adopted for data in conformance to a communication protocol on a network.

FIG. 11 presents an example of a filter table.

FIG. 13 presents an example of a signed communication data format.

FIG. 14 presents an example of a key management table.

DESCRIPTION OF EMBODIMENTS

The following is a description of preferred embodiments of the present invention. The explanation focuses on operations of devices and systems on a network such as an onboard network installed in a mobile body such as a vehicle, data being transmitted/received through the network. While the present invention is ideal in applications in an onboard network device and a data transmission/reception system in an onboard network, it may be otherwise adopted in a network device and a network system other than an onboard network device and a data transmission/reception system in an onboard network.

First Embodiment

Configuration of Network System

Figure 1:
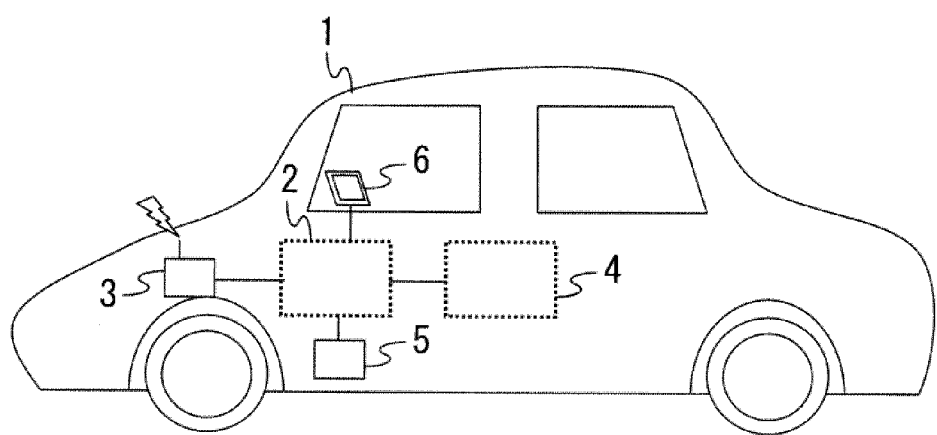
FIG. 1 presents an example of a network system that includes network devices achieved in various embodiments of the present invention.

FIG. 1 presents an example of a network system that includes network devices, as achieved in the first embodiment of the present invention. FIG. 1 shows a control system 1 that includes a network system 2 installed in a mobile body such as an automobile. The network system 2 in FIG. 1 is configured with, for instance, an onboard network (CAN: Controller Area Network, CANFD: CAN with Flexible Data-rate, Ethernet (registered trademark) or the like). FIG.

1 shows a wireless communication unit 3 engaged in wireless communication (e.g., mobile telephone communication or protocol-based communication such as wireless LAN or WAN) with a device outside the control system 1, and a network system 4 that adopts a protocol different from that in the network system 2 or a protocol matching that in the network system 2. FIG. 1 shows a wired communication unit 5, which includes, for instance, a diagnostics terminal (OBD), an Ethernet terminal and an external recording medium (e.g., a USB memory or an SD card) terminal and accesses the network system 2 through a wired connection. FIG. 1 shows an output device 6, such as a liquid crystal display unit, a warning lamp or a speaker, which is connected with the network system 2 through a wired or wireless connection, receives data output from the network system 2 and displays or outputs necessary information such as message information (in the form of, for instance, visual display or sound). The network system 2, connected with the network system 4, the wireless communication unit 3, the wired communication unit 5, the output device 6 and the like, individually exchanges information with them.

Figure 2A:
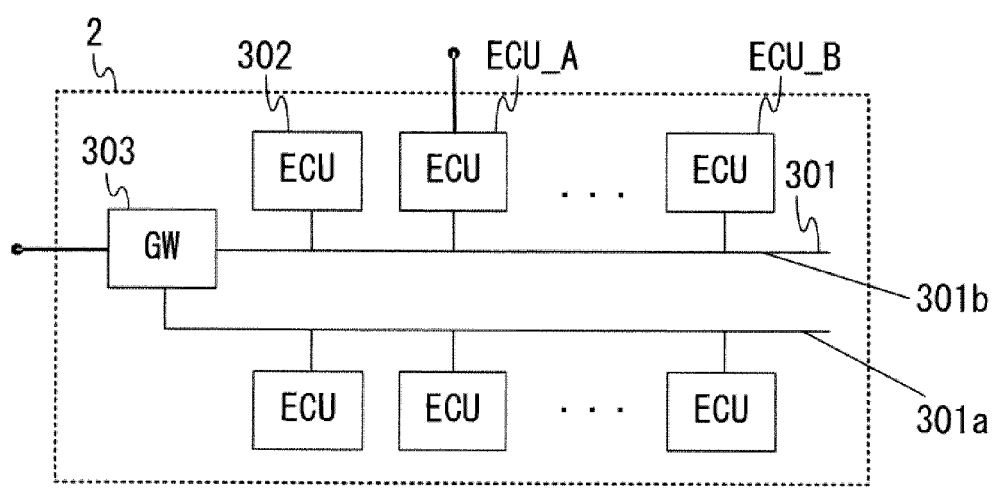
FIG. 2A, FIG. 2B and FIG. 2C each presents an example of an internal structure that may be adopted in the network system.
Figure 2B:
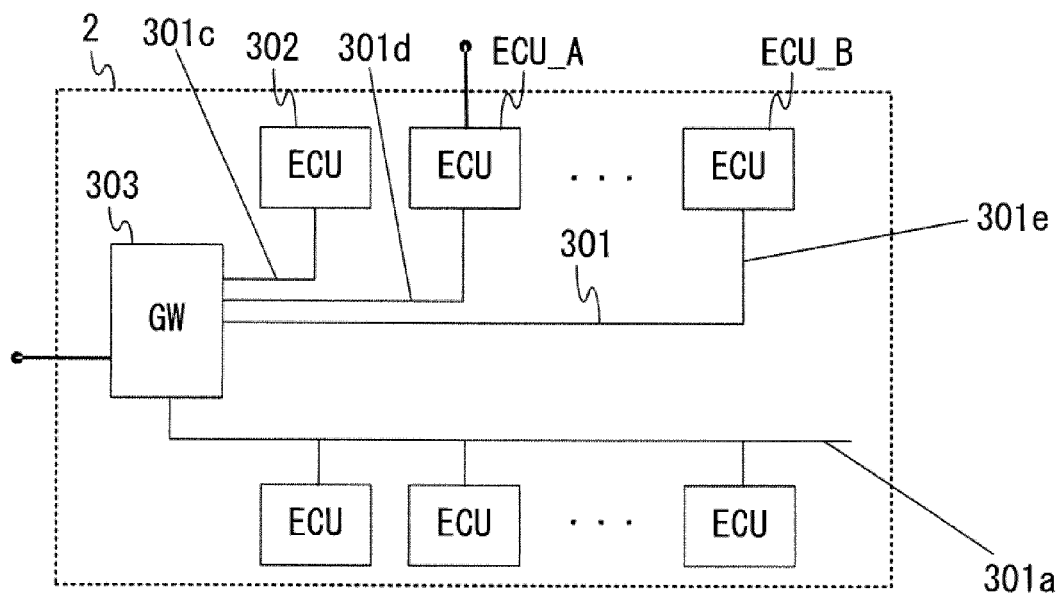
Figure 2C:
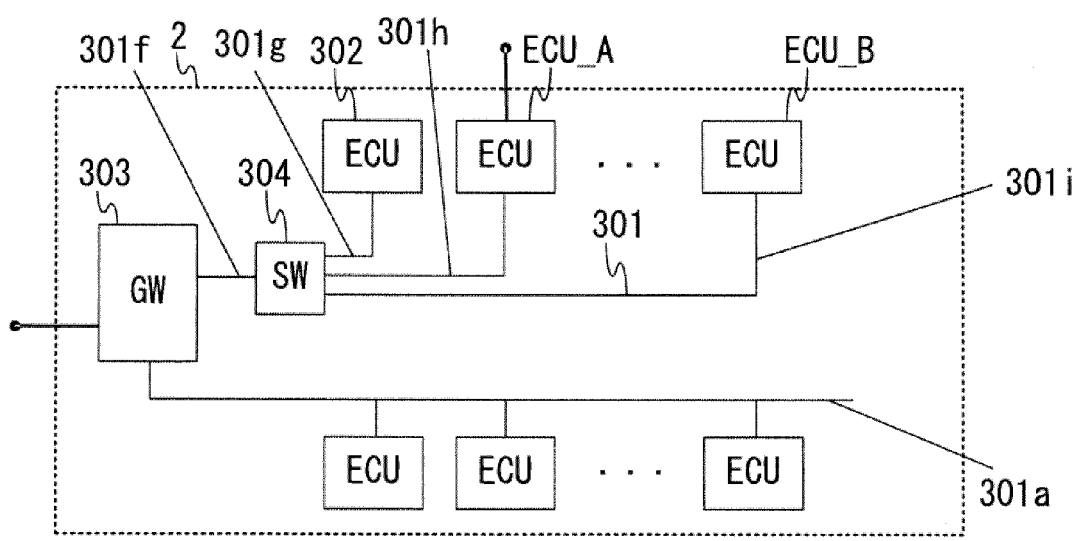

FIG. 2A, FIG. 2B and FIG. 2C each present an example of an internal structure that may be assumed in the network system 2. FIG. 2A, FIG. 2B and FIG. 2C each show a plurality of network links 301 configuring a bus that connects network devices on the network. A network link 301 may be, for instance, a network link in a CAN bus. FIG. 2A, FIG. 2B and FIG. 2C each show ECUs (Electronic Control Units) 302, each connected to a network link 301 and hardware such as a sensor or an actuator (not shown) or a network link (which may be a dedicated line) other than the network link 301 such as an ECU 302 and engaged in hardware control and data exchange on the network. FIG. 2A, FIG. 2B and FIG. 2C each show a gateway (hereafter referred to as a GW) 303 that connects the plurality of network links 301 and exchanges data with the individual network links.

The GW 303, which may be connected to a plurality of network links 301, assigns an ID to each link and is thus able to identify a specific link for which internal processing is being executed. The ID enabling such identification will be referred to as a link ID. The link ID may be otherwise referred to as a channel ID or a domain ID.

FIG. 2A, FIG. 2B and FIG. 2C present representations of network topologies distinguishable from one another. In the example presented in FIG. 2A, a plurality of ECUs 302 are connected to each of two network links 301a and 301b constituting a bus. The GW 303 relays data being transferred between an ECU 302 connected to the network link 301a and an ECU 302 connected to the network link 301b.

The topology example presented in FIG. 2B includes both a star-type topology whereby a plurality of ECUs are each directly connected to the GW 303 via a network link 301c, 301d, . . . or 301e and a bus-type topology. The bus is configured with a network link 301a and the network links 301c, 301d, . . . and 301e. The GW 303 relays data being transferred between ECUs 302 via two network links among the network links 301a, 301c, 301d, . . . and 301e.

In the example presented in FIG. 2C, a switch (hereafter referred to as an SW) 304 is inserted in a star-type topology. The SW 304 is connected to the GW 303 via a network link 301f on the uplink side. The SW 304 individually connects with ECUs 302 via network links 301g, 301h, . . . and 301i on the downlink side. The bus is configured with a network link 301a and network links 301f, 301g, 301h, . . . and 301i. The SW 304 relays data being transferred between ECUs 302 via two network links among the network links 301f, 301g, 301h, . . . and 301i. The GW 303 relays data being transferred between ECUs via the network links 301a and 301f.

The GW 303 is not necessarily physically separated from an ECU 302. For instance, the present invention may be adopted in conjunction with ECUs having a GW function or a GW having an ECU function.

In the following description of the embodiment, network protocol conversion is carried out at the GW 303 but is not carried out at the SW 304. The present invention may also be adopted either in the GW 303 or in the SW 304.

In the following description, devices such as the GW 303, the ECUs 302 and the SW 304, which are connected via network links, may be otherwise referred to as network devices.

Communication is carried out via network links 301 in compliance with a network protocol (procedure), which will be described later. In compliance with the protocol to be described later, communication is carried out by appending a header, which is determined in the protocol, to data (hereafter referred to as communication data or payload) to be transmitted/received between network devices.

An ECU 302 executes mobile-body control processing based upon data received through the network so as to, for instance, output a control signal to the hardware, output a control signal and the information to the network and alter the internal state.

Figure 3:
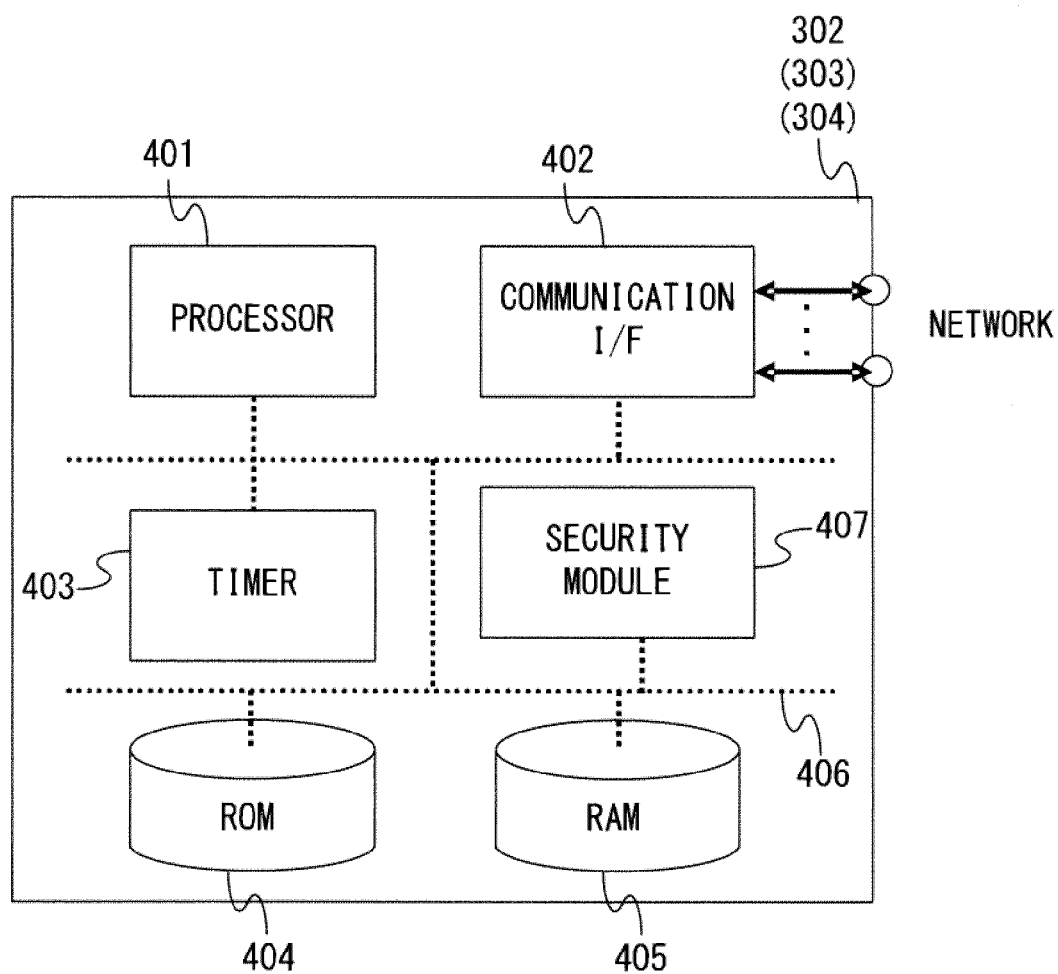
FIG. 3 is a diagram presenting a structural example for a network device.

FIG. 3 presents an example of an internal structure that may be adopted in the network device according to the present invention, which may be embodied as the GW 303, an ECU 302 or the SW 304. FIG. 3 shows a processor 401 such as a CPU, which is equipped with a storage element, e.g., a cache or a register and executes control. FIG. 3 also shows a communication interface 402 via which data are transmitted to or received from a network link 301. FIG. 3 further shows a timer 403 that manages time lengths and the current time by using a clock (not shown) or the like. In addition, FIG. 3 shows a ROM (Read Only Memory) 404 in which a program and nonvolatile data are saved, a RAM (Random Access Memory) 405 in which volatile data are saved and an internal bus 406 via which internal communication is carried out within the ECU. FIG. 3 also shows a security module 407 that protects key information and the like and executes operations such as authentication, hash operation, encryption and decryption.

The use of the security module 407 makes it possible to protect the key information from unauthorized access and reduce the processing load such as authentication. However, if it is not critical to assure strict tamper resistance, the security module 407 will not be necessary.

Figure 4:
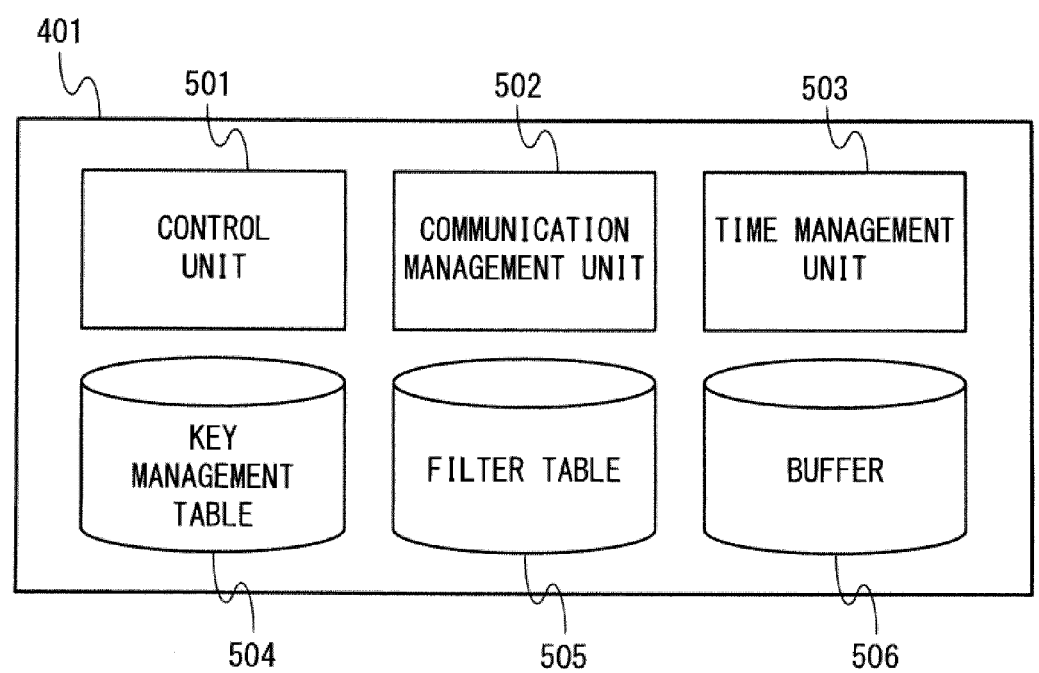
FIG. 4 presents an example of a software module structure that may be adopted in a network device.

FIG. 4 shows the configuration of software modules engaged in operation in the CPU 401. FIG. 4 also shows a communication management unit 502 that manages operations and the state of the communication interface 402 and issues instructions for the communication interface 402 via the internal bus 406. FIG. 4 further shows a time management unit 503 that obtains information pertaining to time lengths and executes control pertaining to time lengths by managing the timer 403. In addition, FIG. 4 shows a control unit 501 that analyzes data obtained via the communication interface 402 and executes overall control of the software modules. FIG. 4 also shows a key management table 504 and a filter table 505, both of which will be described later, and a buffer 506 where received data are held.

FIG. 4 illustrates the concept of operations executed at the processor 401. Each software module enables the processor 401 to obtain information needed for a specific operation from the ROM 404 and the RAM 405 or to write such information into the ROM 404 and the RAM 405. It is to be noted that since the data processing and the authentication processing, which will be described later, may be required to be executed at high speed, the analysis of data obtained from the communication interface 402, executed by the control unit 501 in FIG. 4, may be achieved in hardware.

<Examples of Network Protocols: CAN and CANFD>

Figure 5A:
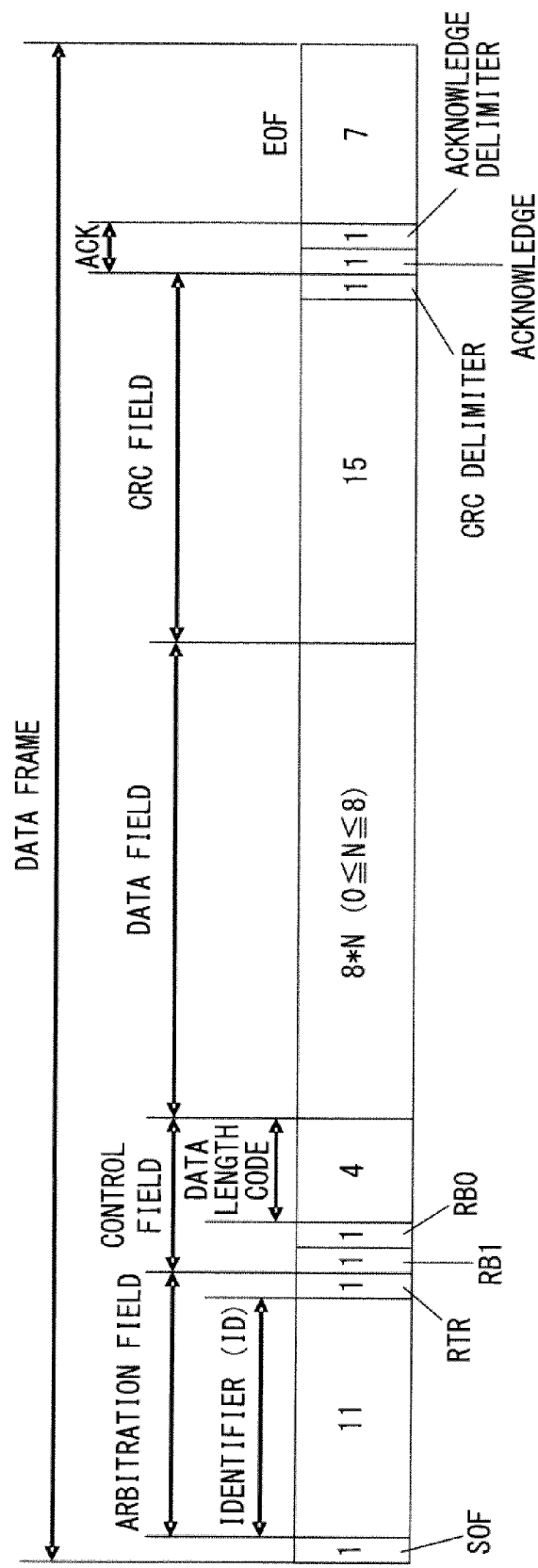
FIG. 5A, FIG. 5B, FIG. 5C and FIG. 5D each presents an example of a data structure that may be adopted for data in conformance to a specific communication protocol on a network.
Figure 5B:
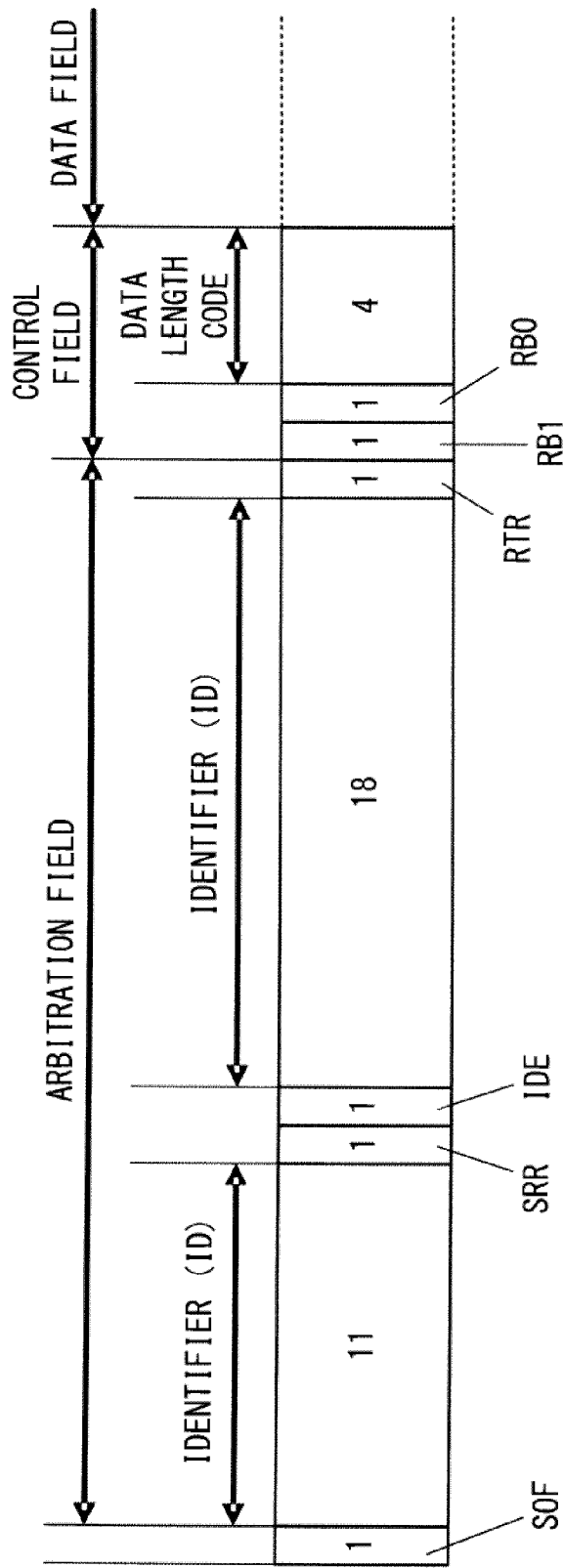
Figure 5C:
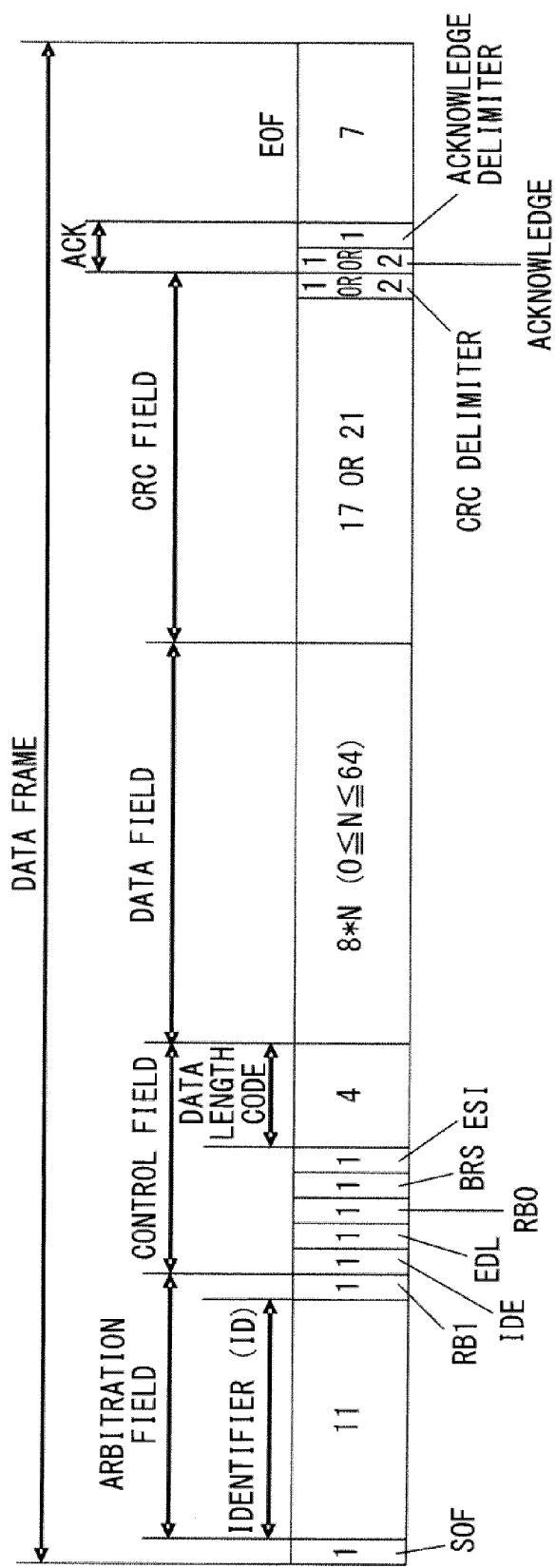
Figure 5D:
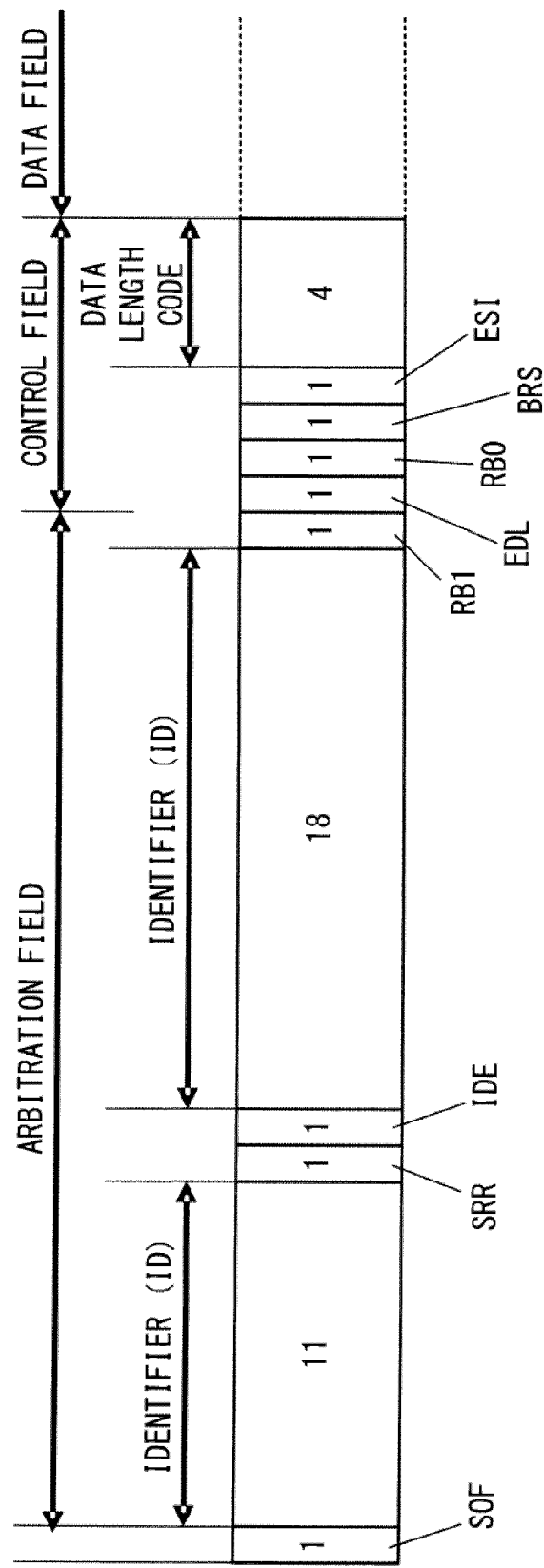

FIG. 5A, FIG. 5B. FIG. 5C and FIG. 5D present examples of data structures that may be adopted in conjunction with specific communication protocols in conformance to which communication is carried out via network links 301. For each example, the data structure of a frame (also referred to as a block or a packet in network communication) that is transmitted/received in conformance to the CAN or CANFD protocol is shown, with numerical values each indicating the number of bits corresponding to a specific field.

In conformance to the CAN or CANFD protocol, communication is carried out by network devices connected on a common network link, each network device setting a bus signal to the dominant value (0) at the time of transmission and each network device detecting the bus signal to be either in the dominant state (0) or the recessive state (1) at the time of transmission or reception.

An SOF (Start Of Frame) indicates the start position of the frame. It is also used for frame synchronization.

In an identifier (ID) field, the ID of the particular CAN data (hereafter referred to as a CAN ID) is indicated. The data type of the CAN data can be identified based upon the CAN ID.

The ID field and an RTR (Remote Transmission Request) bit are referred to as an arbitration field and this field is used for bus arbitration.

An RB1 and an RB0 are reserved bits, where the dominant value is consistently input in the example presented in FIG. 5A. However, when the recessive value is indicated in the RB0, an extended format such as that shown in FIG. 5B is assumed, allowing the ID to be expressed with 29 bits. The structure adopted in the extended format for the data field and beyond is identical to that shown in FIG. 5A.

A data length code indicates the length (number of bytes) of the data in a data field.

The content of the data to be transmitted are indicated in the data field. Data equivalent to N bytes are transmitted by assuming a variable length. The data field may otherwise be referred to as a payload.

CRC results for the frame are entered in a CRC field. When the frame is transmitted, the recessive value is sustained in a CRC delimiter bordering on an acknowledge field.

When a receiver node (network device) has received the data successfully, the acknowledge bit in the acknowledged field is set to the dominant value in response. A response pertaining to data having been transmitted is thus returned.

An EOF (end of frame) indicating the terminating end of the frame is a 7 bit recessive field. Data are transmitted and received by adopting the format described above.

Various types of control are executed for a vehicle via an onboard network engaged in processing whereby, for instance, a particular network device regularly transmits a value (e.g., a sensor value) obtained by the particular network device through measurement, to the network and a state indicated by the value is reported to another network device.

In a CAN, arbitration is carried out in the arbitration field when data are transmitted. When data transmissions start simultaneously, a network device with lower priority (with a greater CAN ID (i.e., the network device having transmitted fewer dominants during the arbitration)) suspends the transmission. This means that even when individual network devices attempt to transmit data cyclically, a suspension may occur as a result of the arbitration or another network device may already be transmitting data when a data transmission starts. In such a case, the transmission cycles may become offset. This phenomenon, in which a plurality of network devices attempt to transmit data with overlapping timing or in which the bus is already being used when a network device attempts a data transmission, will be referred to as a collision.

Next, the CANFD protocol will be explained. Since the CANFD is a protocol that is an extended version of the CAN, the following explanation will focus on the difference from CAN. FIG. 5C shows the data structure assumed in the standard CANFD format.

An EDL is a bit indicating that the CANFD format is assumed. Namely, the EDL set to the recessive value indicates that the transmission data assume the CANFD format and the EDL set to the dominant value indicates that the transmission data assume the CAN format.

A BRS indicates whether or not the bit rate is to be switched during data transmission. The BRS set to the recessive value indicates that the bit rate is to be switched during the data phase, whereas the BRS set to the dominant value indicates that the bit rate is not to be switched.

An ESI indicates an error status of the network device that is to transmit data. The ESI set to the dominant value indicates that the network device to transmit data is in an error active state, whereas the ESI set to the recessive value indicates that the network device to transmit data is in an error passive state.

In addition, the method adopted for data length coding, in the data length code field, in the CANFD protocol is different from that in the CAN protocol. FIG. 6 shows data length coding methods. In the CAN protocol, bit 0, bit 1 and bit 2 in data with an 8-byte data length are Don't-Care bits. As the chart in FIG. 6 indicates, the CANFD protocol allows data to be expressed with up to 64 bytes.

The CRC field in the CANFD protocol assumes a variable length. In other words, the field length, which changes in correspondence to the data length, takes on a 17-bit field length or a 21-bit field length. In addition, the CANFD protocol accommodates 2 bit data in the CRC delimiter field and the acknowledge field.

An RB1 and an RB0 are reserved bits, where the dominant value is consistently input in the example presented in FIG. 5C. In the CANFD protocol, when the recessive value is indicated in an IDE, an extended format such as that shown in FIG. 5D is assumed and the ID can thus be expressed with 29 bits. The structure adopted in the extended format for the data field and beyond is identical to that shown in FIG. 5C.

The arbitration field and the control field in the CAN protocol may otherwise be referred to as a header.

The CRC field is included in order to enable verification as to whether or not a signal contains any error. If data having been received by the recipient match the content having been transmitted by the sender and the content resulting from a CRC operation executed at the sender, the identical results are indicated through a CRC operation executed on the recipient side. These measures allow the recipient to decline data reception (to discard the data) if the received data do not match the transmission data that the sender has intended to send (in the event of a CRC error).

<Example of Network Protocol: Ethernet>

FIG. 7A and FIG. 7B show data structures (frame structures) that may be assumed in conjunction with the Ethernet protocol. FIG. 7A shows a structure adopting the DIX format, whereas FIG. 7B shows a structure adopting the IEEE 802.3 format.

In a preamble field and an SFD (Start Frame Delimiter) field, data assuming a fixed pattern, used to achieve communication synchronization, are entered. In a destination address field, the address of the data transmission destination is indicated, whereas in a source address field, the address of the data transmission source is indicated. In a type field, a value indicating a upper layer protocol type is entered, with the length indicating the length of the data field (octet: in 8-bit units), whereas the payload of the data is entered in a data field. An FCS (Frame Check Sequence) is a field for frame error detection where operation results similar to the CRC operation results explained earlier are held. The numerical values in the figures each indicate the length (in octet units) of the corresponding field.

<Examples of Network Protocols: IP/TCP/UDP>

The IP (Internet protocol) represents an example of a upper layer protocol to the Ethernet and CAN protocols. Data structures that may be adopted for data in conformance to the Internet protocol are shown in FIG. 8A and FIG. 8B. Different structures, each corresponding to a specific version, are adopted for the IP header. FIG. 8A shows the header structure corresponding to version 4 (IPv4), whereas FIG. 8B shows the header structure corresponding to version 6 (IPv6). Although the IP headers corresponding to the two versions have different lengths, the header information in either version includes the source address information and the destination address information so as to enable identification of the sender and the recipient. The communication data are included in the payload.

Upper protocols to the IP protocol include the TCP protocol and the UDP protocol. FIG. 9 shows an example of a TCP header structure, whereas FIG. 10 presents an example of a UDP header structure. The header information in the TCP/UDP layer protocols does not include sender information or recipient information, but indicates the ports being used (numbers enabling identification of communication types).

Within the layered structure constituted with the plurality of protocols described above, communication may be carried out by using, for instance, the TCP/IP/Ethernet protocols. Under such circumstances, communication data to be transmitted are appended with the TCP header, the IP header and the Ethernet header and all the data are joined or split as needed before they are transmitted.

By comprehending the layered structure, the exact positions in the received data at which the information identifying the sender and the information identifying the content of communication are inserted and the position of the data needed for authentication can be accurately ascertained.

<Format Errors>

The protocols described above include fields with specific bits indicating a predetermined value or a value within a predetermined range. Such a specific bit may be, for instance, a reserved bit. An instance of any of such bits indicating a value other than that defined in the particular format will be referred to as a format error.

In addition, a bit stuffing rule, whereby a different value is taken after a given value is sustained over five consecutive bits, is adopted in the CAN protocol so that the same value is not consecutively taken for six bits or more during normal communication. An infringement of this stuffing rule will also be referred to as a format error.

Furthermore, a manifestation of a pattern other than a predetermined pattern (e.g., serial electrical potential values are indicated four times in a row), attributable to the modulation method adopted in the physical layer or the coding method adopted in the data link layer, will also be referred to as a format error.

<Data that can be Overwritten and Data that Cannot be Overwritten>

When data are transmitted in conformance to any of the protocols described above, the sender transmits each signal by controlling the level (1, 0) of the electrical potential or by controlling the level of the electrical potential differential between twisted-pair cables, and the recipient receives signals by making a decision under similar control. In such a data transmission, a dominant signal status, as defined in the protocol physical layer, may manifest.

For instance, in the CAN protocol, the electrical potential is set to 0 or the potential differential is set to 0 in the dominant state (0), and if any of the network devices connected to a link grounds a signal line thereof, the other network devices cannot issue the recessive value (1). For this reason, data indicating the recessive value can be overwritten, whereas data indicating the dominant value cannot be overwritten.

In the Ethernet protocol, which adopts a different structure for the physical layer, the electrical potential being transmitted can be set to an overwritable value or an nonoverwritable value by likewise grounding a signal line so as to allow or disallow a data overwrite.

<Filter Table>

FIG. 11 presents an example of the filter table 505. For each set of data, the filter table in FIG. 11 provides a data ID 1201 used to identify the data transferred via a bus, a sender link ID 1202 assigned to a network link 301 to which the data sender ECU 302 is connected, a recipient link ID 1203 assigned to a network link 301 to which the data recipient ECU 302 is connected, a sender protocol 1204 indicating the data communication protocol used at the sender ECU 302, a recipient protocol 1205 indicating the data communication protocol used in the network link 301, to which the data recipient ECU 302 is connected, and an authentication target flag 1206 indicating whether or not the particular data are an authentication target.

The filter table 505 is a management table used to determine whether or not data transfer via the bus is permitted based upon whether or not the target data have a match in the data IDs 1201. Filter tables 505 are also installed in the GW 303 and the SW 304 where data transfer processing is executed to transfer data with a matching data ID 1201 from one network link 301, i.e., the uplink, to another network link 301, i.e., the downlink. The filter tables 505 installed in the GW 303 and the SW 304 each function as a forwarding table that indicates, based upon the sender Link ID 1202 and the recipient Link ID 1203, a specific uplink through which data matching a specific data ID 1201 arrive and a specific downlink through which the data depart. The filter tables 505 installed in the GW 303 and the SW 304 also each function as a protocol conversion table that indicates, based upon the sender protocol 1204 and the recipient protocol 1205, whether or not protocol conversion must be executed as the data, having arrived through the uplink, depart through the downlink.

Examples of the data ID 1201 include CAN IDs in the CAN protocol and the CANFD protocol, MAC addresses in the Ethernet protocol, IP addresses in the IP protocol, port number in the TCP protocol or the UDP protocol, and a combination of different types of information listed above. For instance, the communication route and the engaged service can be identified based upon the port number in combination with the source and destination IP addresses.

The authentication target flag 1206 indicates whether or not to execute authentication processing, which will be described later, for the data being transferred via the bus. "Yes" indicates that authentication is to be executed for the data, whereas "No" indicates that the data are not to undergo authentication processing. When data bearing all data IDs are authentication targets or only data entered in the key management table 504 to be described later are designated as authentication targets, the authentication target flag 1206 is not required.

The GW 303, having a filter table 505 installed therein, detects, based upon the filter table 505, data being transferred between ECUs 302 connected to a common network link 301 via the bus or detects data transferred over two network links 301. The GW 303 references the sender protocol 1204 and the recipient protocol 1205 registered in the filter table 505 and executes data protocol conversion as needed during the data transfer processing. An ECU 302 having a filter table 505 installed therein does not engage in data transfer processing from one network link 301 to another network link 301. This means that as long as the protocol used in the single network link 301 to which the particular ECU 302 is connected is set, the filter table 505 does not need to hold information indicating the sender link IDs 1202, recipient link IDs 1203, sender protocols 1204 and recipient protocols 1205. If the SW 304 does not execute protocol conversion when data are being transferred from one network link 301 to another network link 301 and a predetermined limited protocol is used in the plurality of network links 301 to which the SW 304 is connected (e.g., only the Ethernet protocol is used in the plurality of network links), the filter table 505 in the SW 304 does not need to hold information indicating sender protocols 1204 and recipient protocols 1205.

<Data Detection Processing, Transfer Processing and Data Processing Executed in the Communication Interface>

In order to enable data detection processing via the communication interface 402, the processor 401 reads filter information registered in correspondence to data IDs assigned during the design phase to indicate, for instance, transfer-requiring data, from the filter table 505 and sets the filter information thus read out in the communication interface 402. The communication interface 402, with the filter information indicating specific data IDs set therein, monitors signals transferred from sender ECUs 302 to recipient ECUs 302 via network links 301. If data bearing a data ID matching a data ID specified as an authentication target are being transferred on the network links 301, the communication interface 402 hands over the data together with the data ID to the processor 401 so as to enable the processor 401 to execute authentication processing. If the authentication is to be executed in the communication interface 402, the data and the data ID do not necessarily need to be handed over to the processor 401.

During the data detection processing, the communication interface 402 is able to register a data ID other than the data IDs stored in the filter table 505, as explained earlier as an example, by adding the new data ID into the filter table 505. The communication interface 402 may register, for instance, a CAN ID in the CAN protocol or an Ethernet address with a mask specification (which allows any value to be received for a specific bit) into the filter table 505 so as to be able to detect data corresponding to a data ID within a specific range, or it may mask all the bits in a CAN ID or an Ethernet address so as to be able to detect all the data.

In response to a data transfer processing instruction issued by the processor 401, input together with transfer target information to the communication interface 402 disposed in the GW 303 or the SW 304 engaged in data transfer processing for data transferred from the uplink to the downlink, data obtained by appending necessary information to the transfer target information and assuming a data format conforming to the network protocol are put out through a network link 301.

In addition, the communication interface 402 processes the specified data as well as detecting and transferring the specified data. For instance, if the current value of a signal on a network link 301 is 0 in digital representation (e.g., if the electrical potential at the particular network link 301 is lower than a reference value), the communication interface 402 executes an operation for rewriting the signal value to 1 in digital representation (e.g., indicating that the electrical potential at the network link 301 is higher than the reference value). It also executes a reverse operation for rewriting the current signal value of a signal on the network link 301 from 1 to 0 in digital representation. These operations are also executed when returning a communication response (e.g., an Ack (Acknowledgement)).

<Impersonation>

Examples of impersonation or spoofing, prevention of which is a primary objective of the present invention, will be described next in reference to FIG. 2A, FIG. 2B and FIG. 2C. An attacker may attack an ECU 302 (hereafter referred to as an ECU_A) connected to an external communication device, illegally or unauthorizedly rewrite (tamper with) data in the ROM 404 or the RAM 405 within the ECU and use the ECU_A to transmit unauthorized falsified data to the network link 301 by the ECU_A impersonating another ECU (hereafter referred to as an ECU_B). Under such circumstances, other ECU, having received the falsified data, may make an erroneous decision with regard to the current state, leading to an erroneous operation. This form of attack is referred to as an impersonation attack.

The data tampering at the ECU_A is not the only example way of an impersonation attack. An impersonation attack may be otherwise carried out by directly connecting an unauthorized device to the network link 301 or by posing as a device connected to the ECU to transmit false information.

<Authentication Processing>

An impersonation attack may be prevented through authentication of data (a message). The term "authentication" refers to a technology whereby the sender creates a signature (electronic signature) by using undisclosed information (hereafter referred to as a key or key information) and the recipient confirms that the data were sent by the right sender by verifying the signature.

For instance, the data may be verified as un-tampered data having been transmitted by the right sender by authenticating a signature (MAC: Message Authentication Code) as message authentication information. Procedures through which this authentication may be carried out are shown in FIG. 12A and FIG. 12B.

Figure 12A:
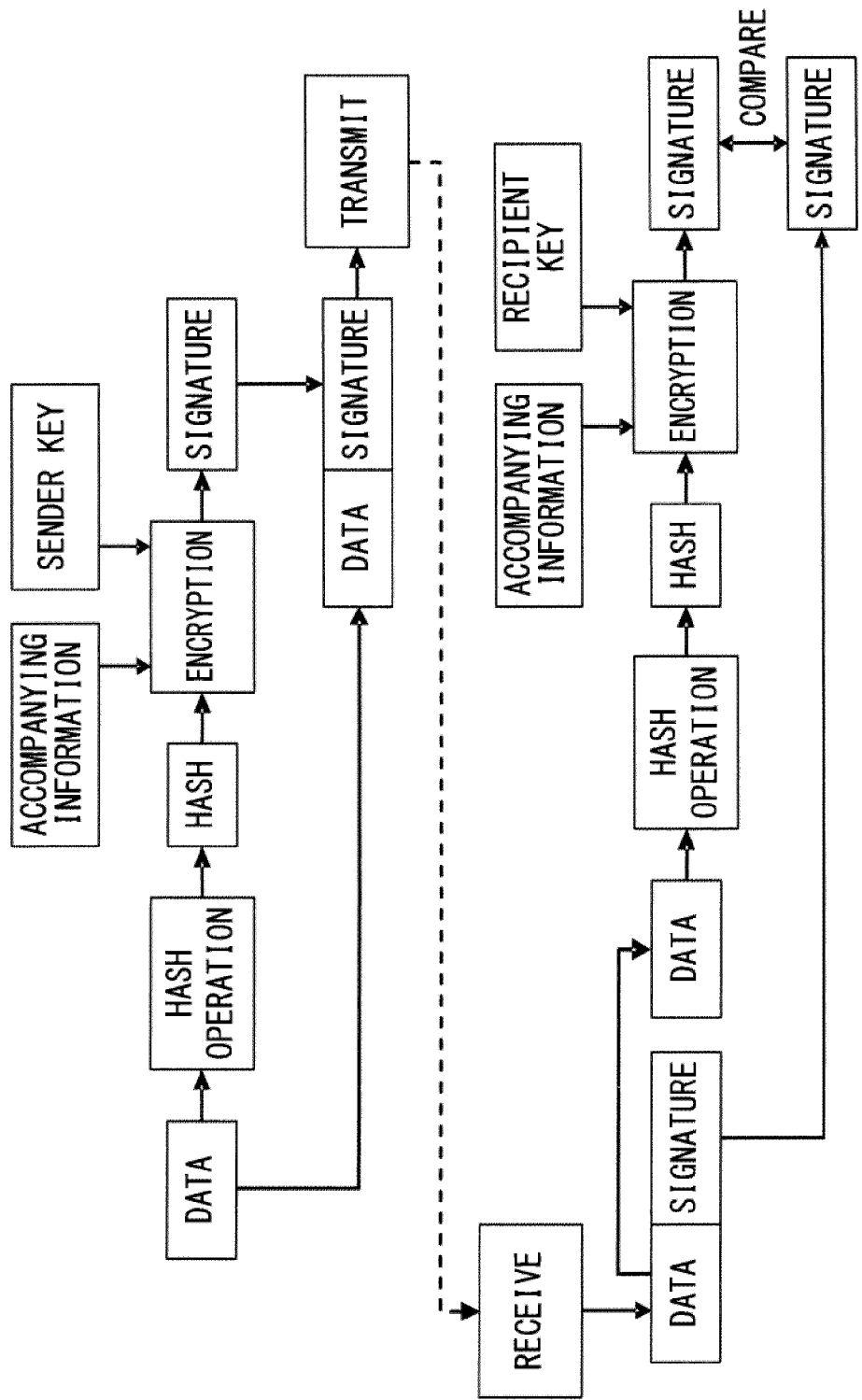
FIG. 12A and FIG. 12B each presents an example of an authentication procedure.
Figure 12B:
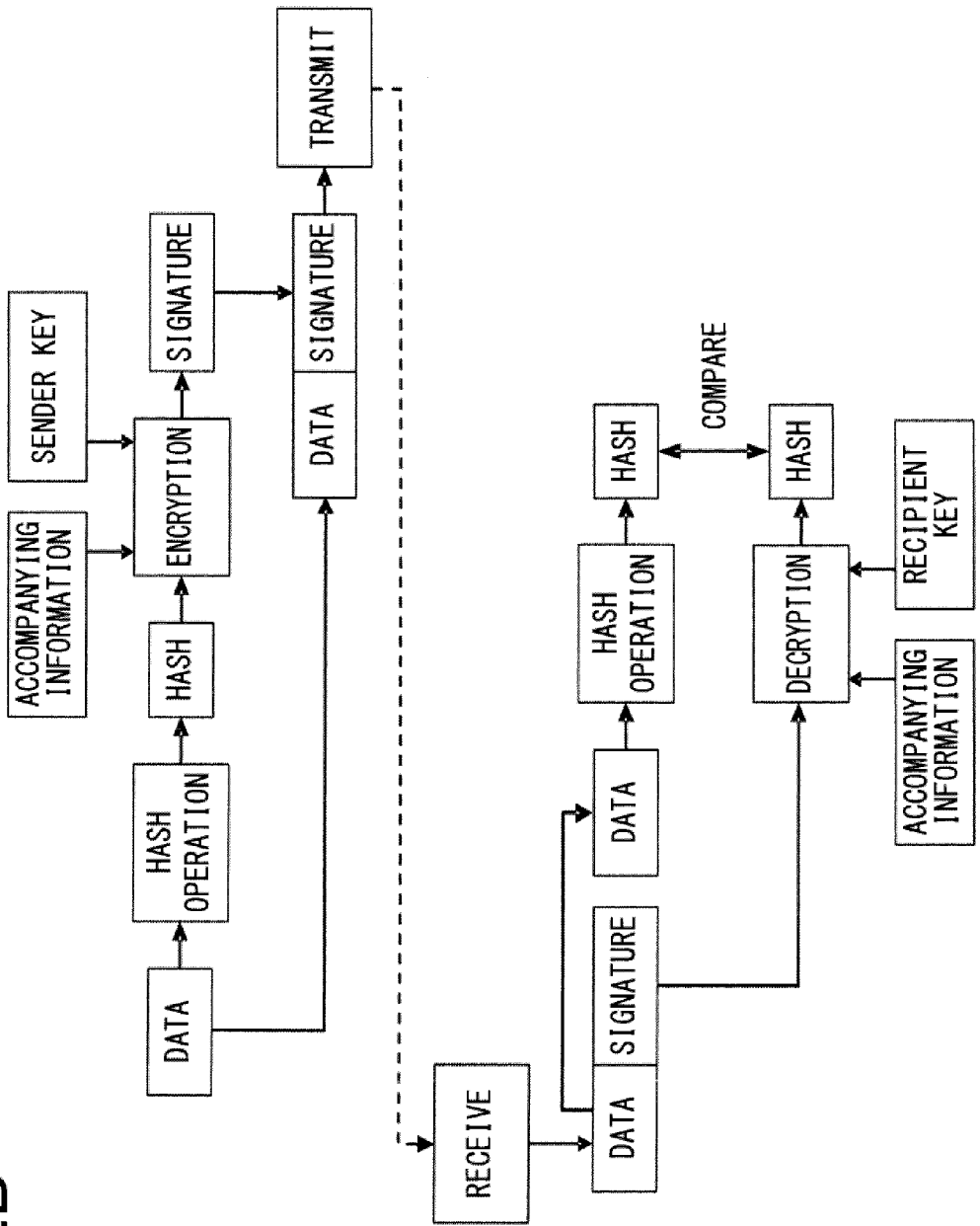

FIG. 12A presents an example of an operation executed by adopting a common key method, i.e., identical key information is shared by the sender side and the recipient side. The sender executes an operation so as to determine the hash for the data to be transmitted. The term "hash" is used to refer to information representing the characteristics of the data. The value indicated in the hash will change greatly if the data have been tampered with, and for this reason, the information is used in order to confirm that the data have not been falsified.

Next, the hash is encrypted (encoded). The key (sender key) held by the sender and accompanying information are used for purposes of encryption. A signature created by encrypting the hash with the sender key is then transmitted together with the data.

The term "accompanying information" is used to refer to information used separately from the key in order to prevent, for instance, a bias in the signature being created. An initialization vector (IV) may be used as such accompanying information. The accompanying information includes information transmitted in advance through a key exchange procedure to be described later or the like or appended to the signature data, so as to be shared by the sender side and the recipient side. The accompanying information may be encrypted together with the data or it may remain unencrypted.

On the recipient side, a signature is generated for the received data through a procedure identical to that having been followed on the sender side. At this time, identical processing is executed by using a recipient side key that is identical to that having been used by the sender and thus, identical signature data are obtained.

If the data or the signature has been falsified (tampered), the two signatures will not match. Thus, it is possible to verify whether or not the target data have been tampered with, which ultimately makes it possible to verify whether or not impersonation of the sender has occurred.

As an alternative to the procedure described above, a hash operation and encryption may be executed simultaneously (HMAC: Hash-Based MAC). In this case, the sender key may be, for instance, added (XOR) to the data undergoing the hash operation, so as to create a signature. Subsequently, a similar operation is executed on the recipient side to generate a signature, and authentication can be achieved by comparing the signatures. If the signatures match, an authentication OK decision is made, whereas if the signatures do not match, an authentication NG decision is made.

In addition, while the operations in the examples described above are executed by adopting a common key method with the sender side and the recipient side sharing the same key information, the present invention may be adopted in processing that does not require a common key (symmetric keys) executed as shown in FIG. 12B. In this example, a procedure similar to that described above is followed on the sender side, but the recipient, instead of following through a similar procedure, ascertains the data hash value by decrypting the signature and compares the hash value thus ascertained with a hash value separately calculated based upon the data so as to verify the signature appended to the data. If the hash values match, an authentication OK decision is made, whereas if the hash values do not match, an authentication NG decision is made. This method enables verification of the signature even when the keys are not symmetrical to each other and makes it possible to execute the hash operation processing and the decryption processing in parallel.

Authentication similar to that shown in FIG. 12B may also be executed in conjunction with a common key.

Since the processing load of an asymmetric key operation is normally high, it is difficult to assure responsive performance or real time performance. For this reason, a common key should be shared in advance through the key exchange procedure to be described later.

The data operation is executed by appending various types of data along with the data required for communication to the data. For instance, a timestamp (time point information indicating, for instance, the time of transmission) may be appended to the data and, in this case, a replay attack by an impersonator re-sending the same data to pose as an authorized sender can be prevented. In addition, a random number may be appended to generate different encrypted data each time. In this case, it will be difficult to guess key information. Furthermore, it is possible to verify that data are transmitted in the correct sequence (timing) based upon a counter appended to the data.

No particular processing needs to be executed for the hash operation. If no hash operation processing is executed, the operation load is lowered, although a high level of information mixing cannot be achieved.

<Signed Communication Data Format>

FIG. 13 shows a format of signed communication data. This data format pertains to the data in the payload according to the network protocols having been described earlier.

FIG. 13 shows a signed/unsigned field 1401 in which information indicating whether or not a signature is appended is held, a communication data length field 1402 in which information indicating the length of the communication data is held, a signature length field 1403 in which information indicating the length of the signature is held, a communication data field 1404, a signature data field 1405 holding signature data generated on the sender side through the authentication processing explained earlier, a margin field 1406 used to hold a time margin as necessary until the authentication processing operation is completed and an authentication Ack field 1407 in which authentication result information used to determine whether or not authentication has been carried out normally is held.

Signed communication data do not need to include all the information corresponding to the fields listed above. For instance, the information in the signed/unsigned field may be included in the header in an upper protocol. In more specific terms, the information in the signed/unsigned field may be defined in the type field in the Ethernet header or the protocol field in the IP header protocol as a signature-based protocol. IA reserved bit in the CAN protocol or the CANFD protocol may be used to indicate whether or not the authentication is required. As an alternative, specific combinations of senders, recipients and relevant services to be involved in signed communication data transmission may be determined in advance. These measures eliminate the need for the signed/unsigned field. Since they make it possible to ascertain whether or not the authentication is required prior to the payload reception, faster processing is achieved (the information indicating whether or not authentication is required is received with relatively advanced timing and it can be determined that no decision-making for certain payloads is required). In addition, they enable coexistence with legacy devices (because of data bearing an unauthenticated header in conformance to an incorrect protocol, the data are automatically discarded by the legacy devices).

Furthermore, it is not necessary that each set of transfer data invariably include information indicating the communication data length and the signature length. For instance, the need for the information indicating the communication data length and the signature length can be eliminated by determining in advance fixed values for the communication data length and the signature length, before signature-based communication actually takes place, and carrying out the communication with the fixed values determined. In this case, the volume of data being communicated can be reduced.

The margin field 1406 and the authentication Ack field 1407 are not required unless their fields are used because of the usage described later.

Moreover, the signature data do not need to be included in all the data being communicated, and instead, a signature may be generated for each communication unit in an upper layer. For instance, when original 1 MB data are divided into a plurality of packets, only the last packet will need to include a signature. Through these measures, it is possible to reduce the volumes of arithmetic operations that must be executed on the sender side and on the recipient side.

<Key Exchange Procedure>

For successful authentication processing, key management must be assured both on the sender side and on the recipient side. Using the same key continuously over an long period of time, in particular, is bound to raise the security risk since a key information leak is more likely to occur. For this reason, it is desirable to update a temporary key (session key) with every specific interval, instead of continuously using the same key.

Accordingly, two ECUs 302, for instance, exchange key information through key exchange processing. In the key exchange processing, one ECU 302 may encrypt a session key with a public key provided by the other ECU 302 and transmit the encrypted session key to the other ECU 302. The other ECU 302, having received the encrypted session key, may then obtain the session key by decrypting the encrypted session key with its own private key. The session key, having been exchanged as described above, is then utilized as the sender key and the recipient key in the authentication processing.

In another example of key exchange processing, the pair of keys, i.e., the public key and the private key, is not used. Instead, an inherent key (master key) is embedded in the ROM 404 or the security module 407 in each ECU 302 at the time of production or maintenance, and the master key information is exchanged at the time of production or maintenance with each ECU 302 with which the particular ECU 302 is to engage in communication. When the product is used, a session key encrypted by using the individual master keys is shared.

Through either of these methods, the key information or various types of information pertaining to the key information (such as the validity period for the key, the initialization vector, the encryption target data ID and the like) can be exchanged securely. It is to be noted that while an explanation has been given in reference to ECUs 302, the concepts described above are all applicable to the GW 303 or the SW 304.

<Key Management Table>

FIG. 14 presents an example of the key management table. The key management table 504 provides the following information; a data ID 1501 enabling identification of the particular authentication target data, a protocol 1502 in conformance to which the authentication target data are communicated, key data 1503 used for authentication, a validity period 1504 for the key data, a flag 1505 that indicates whether or not the key is valid, a data length 1506 of communication data 1404 and a signature length 1507. The key management table 504 manages keys to be used by the control unit 501 when authenticating authentication target data.

The data IDs 1501 are similar to the data IDs 1201 in the filter table 505. Based upon the information in a data ID 1501 indicating the communication route, the engaged service and the like pertaining to a specific set of data corresponding to the data ID 1501, the key corresponding to the particular data ID 1501 can be determined.

In addition, since the protocol 1502 is indicated, the specific positions at which the communication data and the signature are included in the received data can be ascertained. Information matching the protocol 1502 is also included in the filter table 505, an example of which is presented in FIG. 11. As long as the protocol information 1502 is included either in the key management table 504 or in the filter table 505, it can be referenced in correspondence to the data ID 1501 or the data ID 1201.

The key data 1503 may be the immediate data value of the key information, a key ID identifying the key or a pointer indicating the key. When the key data 1503 is the key ID, the data may be transmitted to the security module 407 to have the signature verified by specifying the key ID. These measures enable highly secure management of the key data without running the risk of key data leak, and also make it possible to perform authentication without subjecting the processor to an excessive load.

In the field for the key validity period 1504, the validity period for the particular key is entered. Each time the key is updated, the validity period is also updated as necessary. Certain keys may be valid indefinitely. If no key has been obtained, information indicating that a key is yet to be obtained (e.g., information indicating the absolute past time: ALL0, for instance) may be entered. Through these measures, the need for the key information valid flag 1505, to be described later, is eliminated.

The key information valid flag 1505 indicates whether or not the corresponding key information is valid. A key invalid state may manifest when, for instance, the key information corresponding to the specific data ID has not been exchanged with the sender network device or when the key information has been invalidated due to unauthorized access or an attack.

The communication data length 1506 and the signature length 1507 provide information as provided in the communication data length 1402 and the signature length 1405 in the signed communication data format. With the information for the communication data length 1506 and the signature length 1507 held in the key management table 504, processing for obtaining the communication data length 1402 and the signature length 1405 in the signed communication data format does not need to be executed each time communication is carried out and thus, the processing load can be lightened.

<Processing Executed when Data being Transferred from the Sender ECU to the Recipient ECU Via the Bus are Detected>

Figure 15:
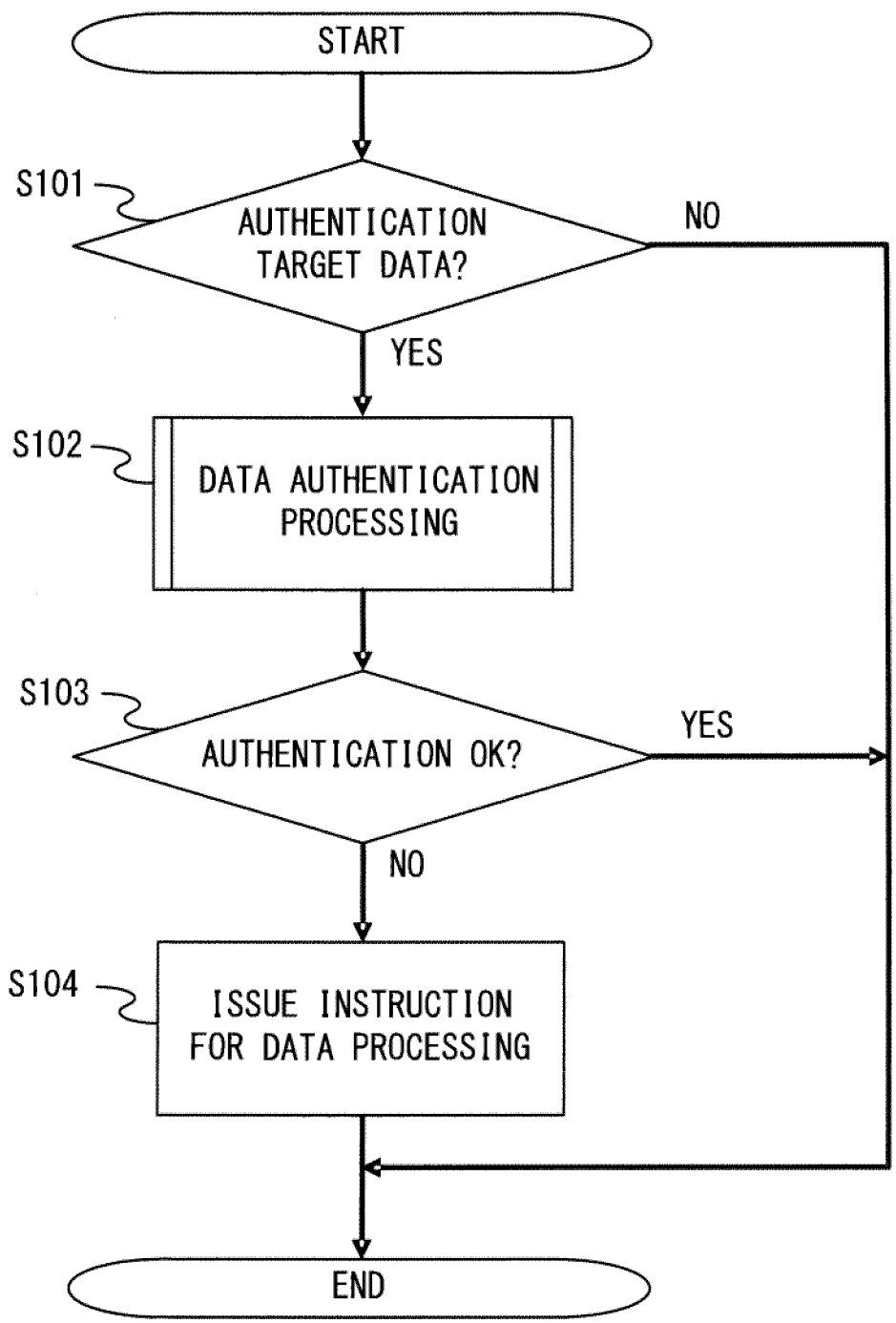
FIG. 15 presents a flowchart of the processing executed in the control unit during data detection.

In reference to FIG. 15, the processing executed by the control unit 501 in the processor 401 of a network device (an ECU 302, a GW 303 or an SW 304) when data being transferred via the bus from a sender ECU engaged in a specific type of control for the vehicle to a recipient ECU likewise engaged in a specific type of control for the vehicle are detected, will be described. While the following explanation is given by assuming that the present invention is adopted in a GW 303, similar processing may be executed in an ECU 302 or an SW 304 in which the present invention is adopted.

First, the communication interface 402 in the GW 303 detects authentication target data, from all the data transferred via the bus through the network links 301, based upon the filter information set by the processor 401. Subsequently, the control unit 501, having been notified of the authentication target data detection by the communication interface 402, references the filter table 505 and the key management table 504 to make a decision as to whether or not the data ID of the data being transferred matches a data ID in these tables with the corresponding authentication target flag set to "Yes" (step S101). It is to be noted that since the communication interface 402 detects authentication target data based upon the filter information set by the processor 401, it is not strictly necessary to reference the filter table 505 or to reference the data IDs in the key management table 504 in step S101. In step S101, a negative decision is made for data, the data ID of which does not match any in the tables or data with the authentication target flag set to "No". If a negative decision is made in step S101, the data authentication processing in step S102 is not executed. An affirmative decision is made in step S101 for data with the data ID thereof matching a data ID in the tables and the authentication target flag set to "Yes". The control unit 501 references the key management table 504 and executes data authentication processing (step S102) based upon the key corresponding to the authentication target data for which an affirmative decision has been made in step S101. As explained earlier, the authentication processing is executed to determine whether or not the data are being transferred by a party posing as the sender ECU 302.

Subsequently, if the authentication results indicate OK (successful authentication), an affirmative decision is made in step S103. In this case, the control unit 501 hands over the authenticated data to the communication interface 402 without executing any special processing on the data. At the recipient ECU 302, which has received the handed-over data, unencrypted communication data 1404 shown in FIG. 13 are extracted from the transferred data. If the authentication results indicate NG for data being transferred through impersonation, a negative decision is made in step S103. Under these circumstances, the control unit 501 judges the data being transferred to be unauthorized data transferred through the impersonation of the sender ECU 302 and when handing the data over to the communication interface 402, it issues an instruction for the communication interface 402 to process the data to, for instance, invalidate the data, as will be described later (step S104).

As described above, by verifying the data authentication results and processing the data to, for instance, invalidate them if the authentication results indicate NG transfer of unauthorized data through impersonation of the sender device can be prevented. It is to be noted that the authentication processing executed as described above in reference to FIG. 15 by the control unit 501 may be executed at the communication interface 402 instead. By assigning the authentication processing to the communication interface 402, higher-speed in processing is achieved. In addition, the data processing executed in step S104 in FIG. 15 at the communication interface 402 in response to an instruction issued by the control unit 501 may instead be executed by the control unit 501. When the present invention is adopted in the device that relays data being transferred over two network links 301, such as the GW 303 or the SW 304, it is desirable that the control unit 501 be engaged in a specific part of the data processing to be described later, referred to as upper layer processing through which the authentication Ack value, for instance, is changed, unlike lower layer processing such as error frame generation.

<Data Invalidation>

The communication interface 402 engaged in data processing, invalidates data by processing the data so as to enable the recipient ECU 302 receiving the data being transferred to detect authentication failure. Data may be invalidated in, for instance, the CAN protocol or the CANFD protocol by generating the dominant value continuously over 6 bits or more in the frame being transferred to render the particular frame as an error frame. Through these measures, the data being transferred can be invalidated.

As an alternative, the authentication Ack 1407 carrying the authentication result information in the signed communication data format, initially set to the recessive value by the sender, may be switched to the dominant value, so as to disallow an overwrite. The recipient network device, having checked the authentication Ack indicating the dominant value, is able to verify that the data have been invalidated due to failed authentication.

In addition, as the authentication Ack data are altered, the CRC operation results are rendered incorrect, and thus, the data, now deemed error-containing data, can likewise be invalidated.

As a further alternative, the dominant value (electrical potential 0) may be taken as a fixed value so as to disable communication over a predetermined length of time. In this case, the data can be invalidated by disabling subsequent communication.

In the Ethernet protocol, too, a signal assuming a pattern different from the transmission pattern assumed at the sender may be generated so as to cause a reception error on the recipient side (a decryption error or a frame-check sequence error) and ultimately, to invalidate the data.

In addition, as in the CAN protocol and the CANFD protocol, data may be invalidated in the Ethernet protocol by altering the information in the authentication Ack in the signed communication data format to information indicating authentication failure or by controlling the bus potential so as to disable communication over a predetermined length of time.

As described above, information indicating the overwritable value is transmitted by the sender in the authentication Ack, and the network device executing authentication overwrites the information in the authentication Ack included in unauthorized data to a value that does not allow a subsequent overwrite. This system does not allow the attacker to engage the sender network device in order to execute bus potential control and does not allow the attacker to engage the sender network device in order to transmit normal data by preventing the network device executing authentication from executing the overwrite control, for the remainder of the transfer data being continuously overwritten because of the data deemed unauthorized. Thus, the unauthenticated data can never be erroneously recognized as normal data by the recipient network device.

The data having been invalidated as described above are discarded as error data at the recipient network device which has received the invalidated data, and consequently, execution of processing using unauthorized data at the recipient network device can be prevented.

Unauthorized data transfer can be effectively prevented in the system described above, in which another network device authenticates data having been transmitted by a network device and data having failed authentication are processed for invalidation. In particular, by engaging a network device both in the authentication processing and in the data processing for data being transferred via a network link, the need for authentication processing to be executed at a plurality of data recipient network devices is eliminated. The network device achieved in the embodiment improves the reliability with which an impersonation attack occurring on the network is detected and makes it possible to execute effective protective operations against the attack.

Second Embodiment

An example in which the network device that engages in authentication processing invalidates all transfer data with data formats that do not match expected formats, as well as the invalidation to transfer data having failed authentication, at the time of transfer data detection, will be described next. In reference to FIG. 16, the processing executed in the control unit 501 of the network device achieved in the embodiment at the time of transfer data detection will be explained. The processing differs from that executed in the first embodiment in that it includes an additional step, i.e., step S201, in which data format decision-making processing is executed. Accordingly, an explanation will be given in reference to FIG. 16 by focusing on the difference from the first embodiment, without providing a repeated explanation of the processing executed in steps assigned with the same step numbers as those in FIG. 15.

The term "data format" in this context refers to a format that includes a data ID, a network link ID assigned to the bus to which the data identified by the data ID are transferred, a data header format defined by the protocol above described, a counter indicating the sequence in the data, a timestamp indicating the timing with which the data are transmitted, a key validity period, a communication data length assumed when the data include the signed communication data for the authentication to be explained earlier, a signature length assumed when the data include the signed communication data and the like.

In step S201, the control unit 501 executes the data format decision-making processing for the detected data that are being transferred, and upon deciding that the data format of the data matches an expected data format ("Yes" in step S201), it proceeds to execute the processing in the following step S101 as explained earlier. In more specific terms, if the data format of the detected transfer data matches the expected data format, there are various conditions such as; the data ID 1201 and the recipient link ID corresponding to the transfer data are held in the filter table 505, the authentication target flag for the transfer data is set to "Yes" and the transfer data correspond to a data ID 1501 in the key management table 504, the transfer data correspond to the protocol 1502 and the key data 1503 held in the key management table 504, and the key validity period 1504 corresponding to the transfer data indicates that the key for the transfer data is still valid, the key valid flag 1505 for the transfer data indicates "valid", the communication data length of the transfer data matches the communication data length 1506, and the signature length in the transfer data matches the signature length 1507.

The control unit 501 may decide that the data formats match based upon criteria other than those listed above. Such criteria may include; the counter, as the sequence of the transfer data, included in the communication data indicates consecutive values and the difference between the value indicated in the timestamp as the timing with which the transfer data are transmitted and the current time point is equal to or less than a predetermined value.

It may be more desirable to assign the communication interface 402, rather than the control unit 501, to perform the data format decision-making processing based upon some of the decision-making criteria above described which is used for deciding whether or not the data formats match. In such a case, the results of the criteria-based decision-making having been executed by the communication interface 402 may be reported to the control unit 501.

If the data formats do not match (if the data format decision-making results indicate failure) ("No" in step S201), the control unit 501 engages the communication interface 402 in data invalidation by issuing a data processing instruction for the communication interface 402 (step S104) so as to process the data being transferred, as it does when an authentication NG occurs ("No" in step S103) in the first embodiment and in the current embodiment. It is to be noted that as has already been explained in reference to the first embodiment, the data processing executed by the communication interface 402 in response to an instruction issued by the control unit 501 in step S104 may instead be executed by the control unit 501.

In the embodiment, all the data that may be transferred through the network link where the network device detects authentication target data are registered in the filter table 505 and the key management table 504. These tables compile a white list (a list of all the safe data), which makes it possible to prevent transfer of any data not listed in the filter table (transfer of unauthorized data).

Figure 16:
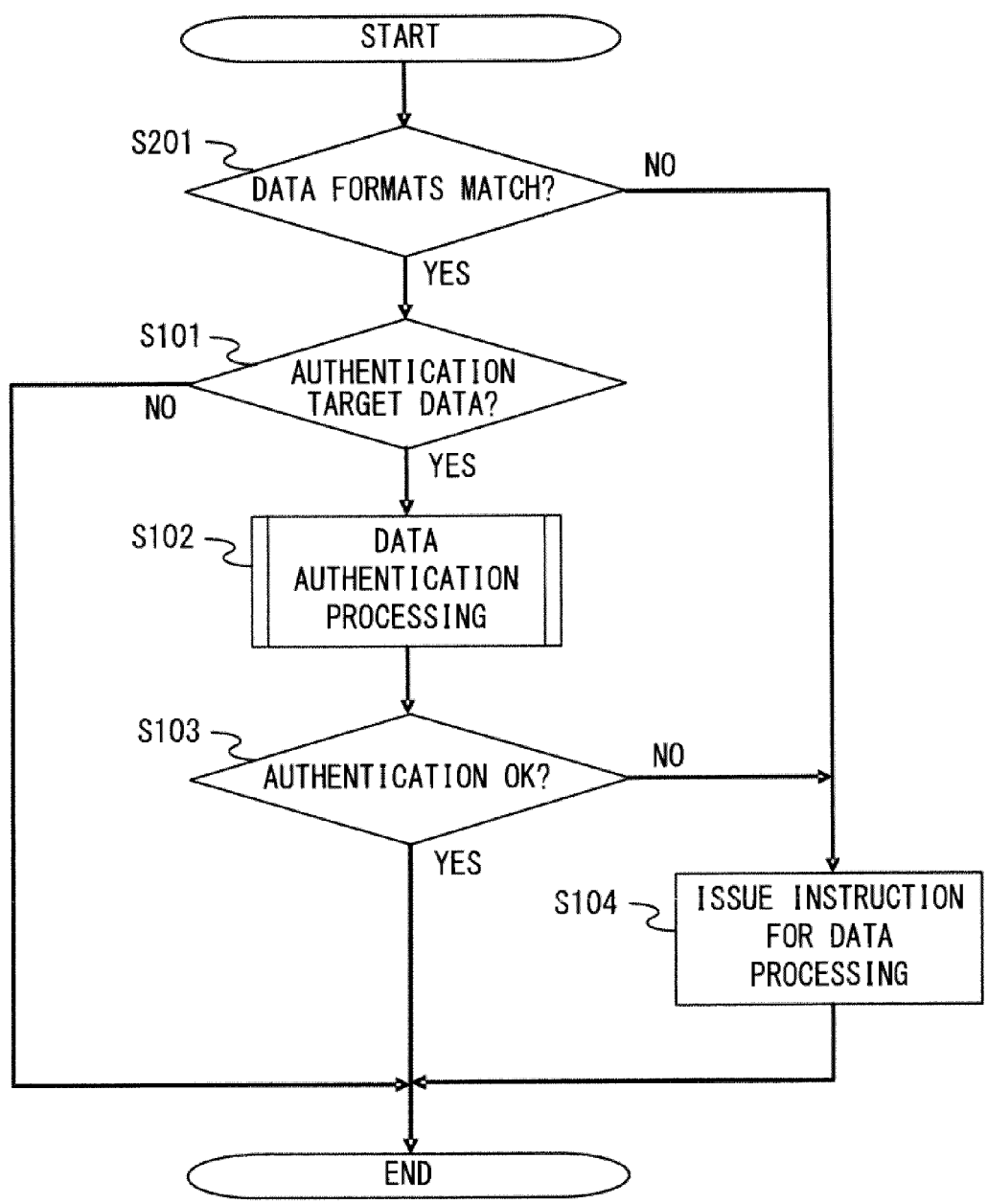
FIG. 16 presents a flowchart of the processing executed in the control unit during data detection in a second embodiment.

As described above, the control unit 501 makes a decision in step S201 in FIG. 16 as to whether or not the data being transferred corresponds to information included in the filter table 505 enabling management with regard to whether or not data transfer via the bus is allowed and corresponds to information included in the key management table 504 enabling management of authentication keys for transfer-allowed data. The communication interface 402 invalidates the data during the data transfer if it is decided in step S201 that the particular data is not found in at least either the filter table 505 or the key management table 504, as well as if it is decided in step S103 that the authentication has failed. As a result, transmission of data, the data ID of which is not included in the filter table 505 and the key management table 504 or transmission of data in an unauthorized format can be prevented. It is to be noted that the processing load of header information-based decision-making is less than that of the authentication processing, and accordingly, the processing load can be reduced by detecting unauthorized data based upon the header information.

Third Embodiment

Next, an example in which data are invalidated as a GW 303 or an SW 304 relays data being transferred from one network link 301 to another network link 301 will be described. While the following explanation is given by assuming that the network device achieved in the embodiment is a GW 303 the present invention may be adopted in a similar manner in an SW 304.

The GW 303 may relay data transferred from the network link 301a to which the sender network device is connected, to the network link 301b, different from the network link 301a, to which the recipient network device is connected, as illustrated in FIG. 2A. In this situation, the GW 303 takes in the data input thereto from the network link 301a to which the sender network device is connected, verifies the recipient based upon the data header, and outputs the data to the network link 301b. Since the data are transferred with low latency, the communication interface 402 or the control unit 501 in the GW 303 analyzes the header of the data being input to the communication interface 402 in the GW 303 and starts outputting the data to the network link 301b as soon as the recipient network device is identified.

Subsequently, the remainder of the data is continuously input from the network link 301a to the GW 303 and just as the signature data included in the data are input to the GW 303, the data authentication processing is executed in the GW 303 as has been described in reference to FIG. 15 or FIG. 16. If it is decided that the authentication results indicate failure ("No" in step S103) or that the data formats do not match ("No" in step S201), data processing is executed as described earlier for the data being output to the network link 301b and/or the data being input from the network link 301a.

Through this processing, data can be transferred with low latency simply with header verification alone and any unauthorized data can be invalidated if it is subsequently decided that authentication results indicate failure.

Fourth Embodiment

Figure 17:
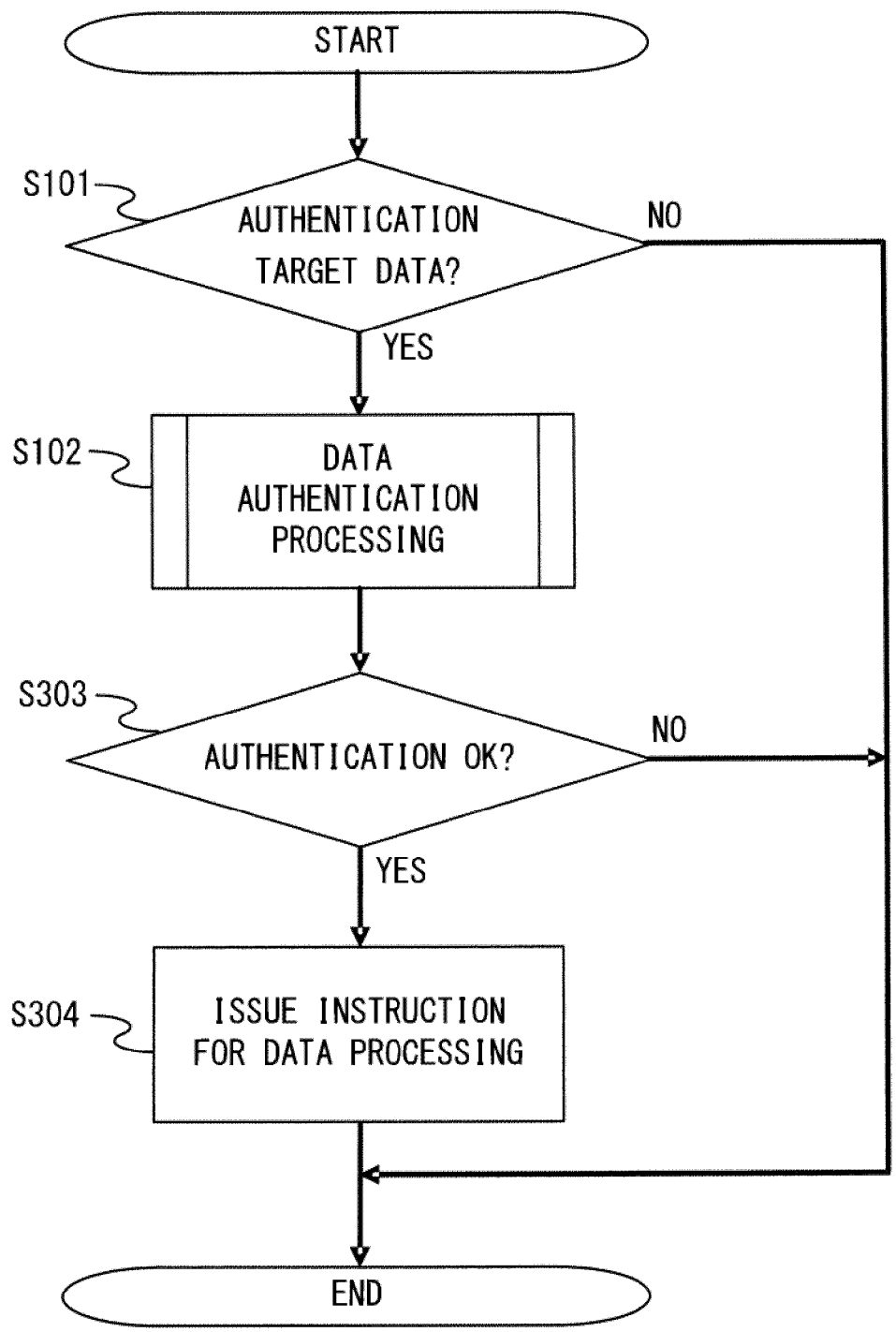
FIG. 17 presents a flowchart of the processing executed in the control unit during data detection in a fourth embodiment.

Next, an example in which a network device adopting the present invention is verified to be in operation will be described. In one method that enables such verification, the control unit 501 in the sender network device creates the authentication Ack information as overwritable information (e.g., indicating the recessive value (1) in the CAN protocol), the communication interface 402 executes CRC operation by using information with the authentication Ack value having been overwritten (e.g., indicating the dominant value (0) in the CAN protocol) and then the data are transmitted via the communication interface 402. This processing will be described in detail in reference to FIG. 17. FIG. 17 presents a flowchart of the processing executed in the control unit at the time of data detection in the embodiment. A repeated explanation of the processing executed in steps assigned with step numbers matching those in FIG. 15, showing the processing executed in the first embodiment by the control unit at the time of data detection, will not be provided.

The control unit 501 in the network device having detected data having been transmitted from a sender network device and being transferred to a recipient network device authenticates the data in step S102 in much the same way as that in the first embodiment. If it is decided in step S303 that authentication has been successful (authentication OK, an affirmative decision is made in step S303), the control unit 501 issues an instruction for the communication interface 402 in step S304 so that the information in the authentication Ack is overwritten with an nonoverwritable value (e.g., the dominant value (0) in the CAN protocol). If the authentication results indicate failure (if a negative decision is made in step S303), the data are not processed. Namely, while data are being transferred, the control unit 501 in the authenticator network device processes the transfer data so as to indicate that the particular data have undergone authentication by overwriting the authentication Ack in the transfer data.

The recipient network device, having received the transfer data, is able to confirm that the data have been successfully authenticated by checking the authentication Ack to verify that it has been overwritten or by verifying that the CRC operation results match the value indicated in the CRC field. Furthermore, with the authentication Ack in the received data having been overwritten, the recipient network device is also able to verify that the authenticator network device is in the normal operating state. The recipient network device, having checked the authentication Ack and confirmed that it has not been overwritten or having verified that the CRC operation results do not match the CRC field value, determines that the received data have not been successfully authenticated by the authenticator network device and that the received data are unauthorized data or the authenticator network device is not in the operating state. Upon making these determinations, the recipient network device discards the received data.

Through these measures, it is ensured that unauthorized data, transmitted under circumstances in which the authenticator network device is not in the normal operating state or the signature operation cannot be completed in time, will not be erroneously judged as authenticated data on the recipient side and that the recipient network device will be prevented from being engaged in operation on an erroneous basis. It is to be noted that the processing for indicating, based upon the authentication Ack, that the authenticator network device is in the normal operating state may be executed while normal data transfer is underway. However, it is more desirable to execute this processing in a diagnostic mode selected when normal data transfer is suspended for maintenance.

In a variation of the embodiment, in which the authenticator network device is verified to be in the normal operating state, data with the dominant value set in the margin 1406 in the signed communication data format shown in FIG. 13 are transmitted until the authenticator network device finishes processing the signature data and data with the recessive value set in the margin 1406 are transmitted upon completing the signature data processing. In this method, too, the authenticator network device can be verified to be in the normal operating state.

In the alternate method described above, neither the sender network device nor the recipient network device executes CRC calculation by incorporating the signal value set in the margin 1406, and instead, the CRC calculation is executed without referencing the signal value set in the margin 1406. As a result, even if the authenticator network device executes authentication processing by using the margin 1406, CRC calculation can be executed for the data including the margin 1406.

In another variation, the control unit 501 of the authenticator network device may transmit information indicating that authentication operation is being correctly executed by the control unit 501 to the sender network device or the recipient network device via a path other than the network links through which the data are being transferred from the sender network device to the recipient network device, e.g., via a network link used for maintenance purposes or via a dedicated line. In this situation, information indicating that the authenticator network device is in the operating state may be provided in the form of fixed-form data that are transmitted on a regular basis, in the form of the signature data explained earlier, in the form of data transmitted with timing matching the data authentication timing and the like, as well as in the form of data assuming the data format described above. As explained above, by verifying, via a plurality of network links or a dedicated line, the operating state of the authenticator network device, the individual network devices are able to correctly confirm that the authenticator network device is in the normal operating state even if one of the paths comes under attack.

(Variation)

A variation in which a stream cipher is used for encoding a signature being generated in order to reduce the processing load of signature generation and authentication will be described. Examples of stream ciphers include MUGI (registered trademark), MULTI-S01, RC4 (registered trademark) and Enocoro (registered trademark). A stream cipher makes it possible to encrypt and decrypt data in units of bits, and thus enables execution of high-speed processing. A signature may be generated as shown in FIG. 12A and FIG. 12B by using a stream cipher in the encryption/decryption processing and thus executing the processing in units of bits (or bytes). Once the signature data are generated, the data and the signature may be spliced in units of bits, or the entire signature data may be first output and then may be integrated with the data.

Either no hash operation is executed in conjunction with a stream cipher, or a hash operation is executed in conjunction with a stream cipher in units matching the bit units or the byte units in which stream ciphering is carried out. The use of a cipher, such as MULTI-S01, having a data mixing function and a data tampering detection function, eliminates the need for the hash operation processing.

By adopting a cipher that enables serial processing, such as a stream cipher, in the encryption process, high-speed decision-making is made possible and, as a result, the signature operation can be completed with ease while the data transfer is underway.

The network device achieved in any one of the embodiments and variations thereof described above, connected via a bus with a sender network device and a recipient network device engaged in specific types of control for a vehicle, includes a control unit 501 and a communication interface 402. Based upon a signature included in the transfer data being transferred via the bus from the sender network device to the recipient network device, the control unit 501 authenticates the transfer data so as to determine whether or not the data are being transferred through the impersonation by the sender network device. If the data have been transferred by the sender network device impersonating another network device and thus the authentication fails, the communication interface 402 invalidates the data while the data transfer is underway. As a result, unauthorized data transfer is prevented. This system eliminates the need for security measures such as authentication processing and key management that would otherwise be required at the recipient network device, and ultimately enables partial networking, which allows the individual network device to be started up only when needed.

The network device achieved in the second embodiment further includes a filter table 505 referenced to determine whether or not transfer of specific data via the bus is allowed and a key management table 504 for managing keys used by the control unit 501 when authenticating data. The control unit 501 in this network device makes a decision during a data transfer as to whether or not the filter table 505 and the key management table 504 hold information corresponding to the data being transferred. The communication interface invalidates the data while the data transfer is underway if the control unit 501 decides that at least one of the filter table 505 and the key management table 504 does not hold information corresponding to the transfer data as well as if the authentication by the control unit 501 has failed. As a result, transmission of unauthorized data in a data format that does not match the data format indicated in the tables is prevented with a lower processing load compared with the processing load incurred when authentication processing is executed.

The control unit 501 in the network device achieved in the fourth embodiment executes a process for the data being transferred so as to indicate that the authentication has been executed by the control unit 501. Through these measures, the authenticator network device can be verified to be in the normal operating state by another network device.

The use of a signature generated with a stream cipher in the encoding process, executed as part of the authentication processing, enables faster decision-making, which, in turn, makes it possible to complete the signature operation while the data transmission is underway.

The above-described embodiments are examples, and various modifications can be made without departing from the scope of the invention.

What is claimed is:

1. A network device connected via a bus with a plurality of network devices, comprising:
   an authentication unit configured to execute authentication based upon message authentication information included in data transmitted, via the bus, by one of the plurality of network devices acting as a sender device; and
   a processing unit configured to:
   determine, if the authentication fails, that unauthorized data have been transmitted by the sender device impersonating another network device among the plurality of network devices; and
   invalidate, upon the determination, the data by generating a value in the data.

2. A network device according to claim 1, wherein:
   if the authentication has failed, the processing unit is configured to invalidate the data by processing the data such that the processed data includes an error.

3. A network device according to claim 1, wherein:
   the data include authentication result information indicating a result of the authentication executed by the authentication unit; and
   if the authentication has failed, the processing unit invalidates the data by setting a value, which is disallowed to be overwritten, in the authentication result information.

4. A network device connected via a bus with a plurality of network devices, comprising:
   an authentication unit that executes authentication based upon message authentication information included in data transmitted, via the bus, by one of the plurality of network devices acting as a sender device;
   a processing unit that invalidates the data upon determining that unauthorized data have been transmitted by the sender device impersonating another network device among the plurality of network devices if the authentication fails; and
   a first table enabling management with regard to whether or not the data are allowed to be transmitted via the bus;
   a second table enabling management of a key to be used for the authentication for the data by the authentication unit; and
   a data format decision-making unit that makes a decision while the data are being transmitted as to whether or not the data correspond with the first table and the second table, wherein:
   the processing unit invalidates the data while the data are being transmitted if the data format decision-making unit decides that the data do not correspond with at least one of the first table and the second table, as well as if the authentication executed by the authentication unit has failed.

5. A network device according to claim 4, wherein:
   the data format decision-making unit makes a decision as to whether or not the data correspond with the first table and the second table based upon at least one of a link ID assigned to the bus via which the data are transmitted, a header format assumed for the data, a counter indicating a sequence in the data, a timestamp indicating timing with which the data are transmitted, a validity period for the key, a communication data length assumed when the data include signed communication data used for the authentication by the authentication unit and a signature length assumed when the data include the signed communication data.

6. A network device according to claim 1, wherein:
the bus includes a first link to which the sender device is connected and a second link through which the data are transmitted; and
if the authentication executed by the authentication unit has failed, the processing unit invalidates the data being transmitted from the first link to the second link.

7. A network device according to claim 1, wherein:
the processing unit further executes a process for the data while the data are being transmitted, so as to indicate that the authentication has been executed by the authentication unit.

8. A network device according to claim 1, wherein:
if the authentication has been successful, the processing unit executes a process for the data so as to indicate that the authentication is being executed by the authentication unit.

9. A network system, comprising:
a sender device; and
a network device connected via a bus with the sender device, comprising:
an authentication unit configured to execute authentication based upon message authentication information included in data transmitted, via the bus, by the sender device; and
a processing unit configured to:
determine, if the authentication fails, that unauthorized data have been transmitted by the sender device impersonating another network device among a plurality of network devices; and
invalidate, upon the determination, the data by generating a value in the data.

* * * * *